United States Patent
Bansal et al.

(10) Patent No.: US 9,276,904 B2
(45) Date of Patent: Mar. 1, 2016

(54) SPECIFYING POINT OF ENFORCEMENT IN A FIREWALL RULE

(71) Applicant: Nicira, Inc., Palo Alto, CA (US)

(72) Inventors: Kaushal Bansal, Sunnyvale, CA (US); Uday Masurekar, Sunnyvale, CA (US); Aravind Srinivasan, Coimbatore (IN); Shadab Shah, Fremont, CA (US); Serge Maskalik, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 14/231,682

(22) Filed: Mar. 31, 2014

(65) Prior Publication Data

US 2015/0237013 A1    Aug. 20, 2015

Related U.S. Application Data

(60) Provisional application No. 61/942,406, filed on Feb. 20, 2014, provisional application No. 61/944,477, filed on Feb. 25, 2014.

(51) Int. Cl.
*H04L 12/22* (2006.01)
*H04L 29/06* (2006.01)

(52) U.S. Cl.
CPC ........ *H04L 63/0263* (2013.01); *H04L 63/0245* (2013.01)

(58) Field of Classification Search
CPC ........................................... H04L 63/02
See application file for complete search history.

(56) References Cited

U.S. PATENT DOCUMENTS

| | | | |
|---|---|---|---|
| 6,496,935 B1 | 12/2002 | Fink et al. | |
| 6,880,089 B1 | 4/2005 | Bommareddy et al. | |
| 7,032,022 B1 * | 4/2006 | Shanumgam et al. | 709/225 |
| 7,055,173 B1 | 5/2006 | Chaganty et al. | |
| 7,349,382 B2 | 3/2008 | Marimuthu et al. | |
| 7,818,452 B2 | 10/2010 | Matthews et al. | |
| 7,948,986 B1 | 5/2011 | Ghosh et al. | |
| 8,032,933 B2 * | 10/2011 | Turley et al. | 726/11 |
| 8,190,767 B1 | 5/2012 | Maufer et al. | |
| 8,365,294 B2 | 1/2013 | Ross | |
| 8,660,129 B1 | 2/2014 | Brendel et al. | |
| 9,015,823 B2 | 4/2015 | Koponen et al. | |

(Continued)

FOREIGN PATENT DOCUMENTS

| | | |
|---|---|---|
| EP | 2748750 | 7/2014 |
| WO | WO 2008/095010 | 8/2008 |
| WO | WO 2013/074828 | 5/2013 |

OTHER PUBLICATIONS

U.S. Appl. No. 14/231,683, filed Mar. 31, 2014, Bansal, Kaushal, et al.

(Continued)

*Primary Examiner* — Venkat Perungavoor
(74) *Attorney, Agent, or Firm* — Adeli LLP

(57) ABSTRACT

Some embodiments of the invention provide a novel method for specifying firewall rules. In some embodiments, the method provides the ability to specify for a particular firewall rule, a set of network nodes (also called a set of enforcement points below) at which the particular firewall should be enforced. To provide this ability, the method of some embodiments adds an extra tuple (referred to below as the AppliedTo tuple) to a firewall rule. This added AppliedTo tuple lists the set of enforcement points at which the firewall rule has to be applied (i.e., enforced).

19 Claims, 16 Drawing Sheets

(56) References Cited

U.S. PATENT DOCUMENTS

| | | | |
|---|---|---|---|
| 2003/0093481 A1 | 5/2003 | Mitchell et al. | |
| 2004/0049701 A1 | 3/2004 | Le Pennec et al. | |
| 2005/0198125 A1 | 9/2005 | Macleod Beck et al. | |
| 2007/0061492 A1 | 3/2007 | van Riel | |
| 2008/0072305 A1 | 3/2008 | Casado et al. | |
| 2008/0082977 A1 | 4/2008 | Araujo et al. | |
| 2008/0267177 A1 | 10/2008 | Johnson et al. | |
| 2008/0289028 A1 | 11/2008 | Jansen et al. | |
| 2008/0298274 A1 | 12/2008 | Takashige et al. | |
| 2009/0007251 A1* | 1/2009 | Abzarian et al. | 726/11 |
| 2009/0129271 A1 | 5/2009 | Ramankutty et al. | |
| 2009/0150521 A1 | 6/2009 | Tripathi | |
| 2009/0235325 A1 | 9/2009 | Dimitrakos et al. | |
| 2009/0249470 A1 | 10/2009 | Litvin et al. | |
| 2009/0249472 A1 | 10/2009 | Litvin et al. | |
| 2009/0327781 A1 | 12/2009 | Tripathi | |
| 2010/0037311 A1* | 2/2010 | He et al. | 726/15 |
| 2010/0100616 A1 | 4/2010 | Bryson et al. | |
| 2010/0125667 A1 | 5/2010 | Soundararajan | |
| 2011/0016467 A1 | 1/2011 | Kane | |
| 2011/0022695 A1 | 1/2011 | Dalal et al. | |
| 2011/0072486 A1 | 3/2011 | Hadar et al. | |
| 2011/0103259 A1* | 5/2011 | Aybay et al. | 370/254 |
| 2011/0113467 A1 | 5/2011 | Agarwal et al. | |
| 2011/0213875 A1 | 9/2011 | Ferris et al. | |
| 2011/0246637 A1 | 10/2011 | Murakami | |
| 2012/0240182 A1 | 9/2012 | Narayanaswamy et al. | |
| 2013/0007740 A1 | 1/2013 | Kikuchi et al. | |
| 2013/0073743 A1 | 3/2013 | Ramasamy et al. | |
| 2013/0074066 A1 | 3/2013 | Sanzgiri et al. | |
| 2013/0163594 A1 | 6/2013 | Sharma et al. | |
| 2013/0227097 A1 | 8/2013 | Yasuda et al. | |
| 2013/0227550 A1 | 8/2013 | Weinstein et al. | |
| 2013/0332983 A1 | 12/2013 | Koorevaar et al. | |
| 2014/0068602 A1 | 3/2014 | Gember et al. | |
| 2014/0115578 A1 | 4/2014 | Cooper et al. | |
| 2014/0195666 A1 | 7/2014 | Dumitriu et al. | |
| 2014/0281030 A1 | 9/2014 | Cui et al. | |
| 2014/0282855 A1* | 9/2014 | Clark et al. | 726/1 |
| 2014/0282889 A1* | 9/2014 | Ishaya et al. | 726/4 |
| 2014/0325037 A1* | 10/2014 | Elisha | 709/220 |

OTHER PUBLICATIONS

U.S. Appl. No. 14/231,686, filed Mar. 31, 2014, Bansal, Kaushal, et al.

Portions of prosecution history of U.S. Appl. No. 14/231,683, Aug. 5, 2015, Bansal, Kaushal, et al.

Portions of prosecution history of U.S. Appl. No. 14/231,686, Aug. 5, 2015, Bansal, Kaushal, et al.

Author Unknown, "AppLogic Features," Jul. 2007, 2 pages, 3TERA, Inc.

Author Unknown, "CISCO Identity-Based Firewall Security," Month Unknown, 2011, 2 pages, CISCO Systems, Inc.

Author Unknown, "Enabling Service Chaining on CISCO Nexus 1000V Series," Month Unknown, 2012, 25 pages, CISCO.

Author Unknown, "Next-Generation Firewalls," Month Unknown, 2013, 1 page, Palo Alto Networks.

Basak, Debashis, et al., "Virtualizing Networking and Security in the Cloud," Month Unknown, 2010, 9 pages, vmware.com.

Casado, Martin, et al., "SANE: A Protection Architecture for Enterprise Networks," Proceedings of the 15$^{th}$ USENIX Security Symposium, Jul. 31, 2006, 15 pages.

Dixon, Colin, et al., "An End to the Middle," Proceedings of the 12th conference on Hot topics in operating systems USENIX Association, May 2009, pp. 1-5, Berkeley, CA, USA.

Dumitriu, Dan Mihai, et al. (U.S. Appl. No. 61/514,990), filed Aug. 4, 2011.

Guichard, J., et al., "Network Service Chaining Problem Statement; draft-quinn-nsc-problem-statement-00.txt," Jun. 13, 2013, pp. 1-14, Cisco Systems, Inc.

Ioannidis, Sotiris, et al., "Implementing a Distributed Firewall," CCS'00, Month Unknown, 2000, 10 pages, ACM, Athens, Greece.

Joseph, Dilip Antony, et al., "A Policy-aware Switching Layer for Date Centers," Jun. 24, 2008, 26 pages, Electrical Engineering and Computer Sciences, University of California, Berkeley, CA, USA.

Scarfone, Karen, et al., "Guidelines on Firewalls and Firewall Policy," Sep. 2009, 48 pages, NIST, U.S. Department of Commerce.

Sekar, Vyas, et al., "Design and Implementation of a Consolidated Middlebox Architecture," In Proc. of NSDI, Month Unknown, 2012, 14 pages.

Sherry, Justine, et al., "Making Middleboxes Someone Else's Problem: Network Processing as a Cloud Service," In Proc. of SIGCOMM, Aug. 13-17, 2012, 12 pages, Helsinki, Finland.

Stojanovski, Nenad, et al., "Analysis of Identity Based Firewall Systems," Jun. 2010, 9 pages.

Stojanovski, Nenad, et al., "Architecture of a Identity Based Firewall System," Jul. 2011, 9 pages.

* cited by examiner

405 — High Level Firewall Rules
with Higher Level AppliedTo Identifiers

| Source | Source Port | Destination | Destination Port | Service | AppliedTo | Action |
|---|---|---|---|---|---|---|
| WS1 | * | DBS1 | * | * | Compute Cluster X | Allow |
|  |  |  |  |  |  |  |
| Any | * | Blacklist | * | * | Datacenter Y | Deny |
| AS10 | * | * | * | http | Logical Switch Z | Deny |

410 — Low Level Firewall Rules
with Lower Level AppliedTo Identifiers

| Source | Source Port | Destination | Destination Port | Service | AppliedTo | Action |
|---|---|---|---|---|---|---|
| WS1 | * | DBS1 | * | * | VNIC 1, VNIC A… | Allow |
|  |  |  |  |  |  |  |
| Any | * | Blacklist | * | * | * | Deny |
| AS10 | * | * | * | http | VNIC M, … | Deny |

412

415 — Host Level Rule Tables

| Source | Source Port | Destination | Destination Port | Service | AppliedTo | Action |
|---|---|---|---|---|---|---|
| WS1 | * | DBS1 | * | Any | VNIC A… | Deny |
|  | * |  | * |  |  |  |

420 — VNIC Level Rule Table

| Source | Source Port | Destination | Destination Port | Service | Action |
|---|---|---|---|---|---|
| WS1 | * | DBS1 | * | Any | Deny |
|  |  |  |  |  |  |

*Figure 4*

SPECIFYING POINT OF ENFORCEMENT IN A FIREWALL RULE

BACKGROUND

Typically, firewall rule definitions include the following five tuples: source, source port, destination, destination port, and service (or application), in addition to an action value. Each tuple specifies a set of identifiers that provide acceptable values for the tuple. This holds true for most of the firewalls in use today, including hardware-based firewalls and software-based firewalls. Hardware firewalls can be used to protect both physical as well as virtual machines (VMs). Hardware firewalls have a number of drawbacks. For instance, hardware firewalls are often choke point solutions, as they each serve as a single choke point for enforcing all firewall rules because all the traffic has to pass through them. Also, they fail to provide security among the machines behind the choke point.

Software firewalls can be implemented as either a service node firewall or VNIC (virtual network interface card) level firewall. The service-node firewalls are similar to their hardware counterpart and enforce firewalling capabilities at the boundaries. Hence, they have the same disadvantages as hardware firewalls, i.e., they are choke points for the network traffic and fail to provide security for the intra network traffic (i.e., for virtual machines behind the choke point). VNIC-level firewalls, on the other hand, enforce security policies as soon as packet comes out of the VM's VNIC. Hence, they can provide security for intra-VM traffic. VNIC level firewalls can also inspect the traffic twice, once at source and once at destination.

In the current models of VNIC-level firewalls, all the rules are applied to all the VMs in the datacenter. In other words, there is a one-to-one mapping between the rule defined at the management plane and the VNIC level rule table. The one-to-one mapping limits the number of rules definition at management level. Also, this approach causes rule bloat at VNIC level firewall table, which, in turn, reduces the processing speed of the firewall engine. This approach also does not have the ability to control whether rule processing is done at source or destination for intra VM traffic. The current VNIC-level approaches are also not truly multi-tenant solution because, in order to achieve multi-tenancy, a user has to create multiple firewall contexts (or multiple firewall tables) at the controller level. Therefore, there is a need in the art for a better firewall solution.

BRIEF SUMMARY

Some embodiments of the invention provide a novel method for specifying firewall rules. In some embodiments, the method provides the ability to specify for a particular firewall rule, a set of network nodes (also called a set of enforcement points below) at which the particular firewall should be enforced. To provide this ability, the method of some embodiments adds an extra tuple (referred to below as the AppliedTo tuple) to a firewall rule. This added AppliedTo tuple lists the set of enforcement points (nodes) at which the firewall rule has to be applied (i.e., enforced).

In some embodiments, the AppliedTo tuple can be configured to identify the set of enforcement point identifiers in terms of network constructs and/or compute constructs. Different embodiments provide different sets of network and compute constructs for use in the AppliedTo tuples of the firewall rules. Examples of such constructs includes (1) individual or set of VNICs or VMs, (2) compute constructs, such as hosts, compute clusters, datacenters, etc., that represent grouping of VMs or hosts in a virtualized or nonvirtualized environment, (3) network elements, such as physical forwarding elements (e.g., physical switches, physical routers, etc.), logical forwarding elements (e.g., logical switches, logical routers, etc.), other managed appliances, unmanaged third-party appliances (e.g., third party firewalls), and/or combination of such elements, and (4) security groups that are formed by a set of one or more VNICs, VMs, hosts, compute constructs and/or network constructs. In some embodiments, the AppliedTo tuple can also be set to a wildcard value, which signifies all possible values for the AppliedTo tuple (e.g., all VNICs).

In some embodiments, one or more of the compute constructs, network constructs and security constructs can be specified as dynamic containers that can have members (e.g., forwarding elements, hosts, VNICs, etc.) dynamically added and/or removed from them. As the AppliedTo tuples of the firewall rules can refer to such dynamically modifiable constructs, the application of the AppliedTo firewall rules (i.e., rules that are specified to include an AppliedTo tuple) can be dynamically adjusted for different locations within a network by dynamically adjusting the membership of these modifiable constructs.

The method of some embodiments distributes the AppliedTo firewall rules to various firewall-enforcing devices. In some cases, each firewall enforcing device is a firewall enforcement node, while in other cases each firewall enforcing device connects to one or more firewall enforcement nodes (i.e., enforcement points) and/or enforces the firewall rules for one or more firewall enforcement nodes. In some embodiments, the method distributes to each firewall-enforcing device only the AppliedTo firewall rules that pertain to that device. In other words, the method of some embodiments filters out the specified AppliedTo firewall rules that do not relate to each firewall-enforcing device from the set of firewall rules that it distributes to the device.

In some embodiments, these firewall-enforcing devices include hosts on which multiple VMs execute. In these or other embodiments, the network nodes that receive the AppliedTo firewall rules, include other types of firewall-enforcing devices. When a dynamic container that is used to define the AppliedTo tuple(s) of one or more firewall rules is modified, the method of some embodiments does not resend the firewall rule to the affected network nodes, but instead only sends the updated membership change to the group that is defined by the dynamic container. The method also sends a firewall rule to a new firewall-enforcing device, or removes a firewall rule from a firewall-enforcing device, when the membership change to a dynamic container requires the addition or removal of a firewall-enforcing device.

The method of some embodiments allows the AppliedTo firewall rules (1) to be specified in terms of higher-level enforcement point identifiers, but then (2) to be distributed in terms of lower-level enforcement point identifiers that are decipherable or easier to decipher by the network nodes that receive the rules. In some embodiments, the method distributes some of the AppliedTo firewall rules to some of the nodes with the AppliedTo tuples, while distributing other firewall rules to other nodes without the AppliedTo tuples. For instance, in some embodiments, the method distributes the AppliedTo firewall rules to hosts with one or more executing VMs, while distributing non-AppliedTo firewall rules to one or more unmanaged third party appliances that cannot process AppliedTo firewall rules. In other embodiments, however, the method distributes AppliedTo firewall rules to some or all unmanaged third party appliances, as these appliances may be able to process AppliedTo firewall rules.

In some embodiments, the network nodes that receive the AppliedTo firewall rules specify, based on the received AppliedTo firewall rules, one or more firewall rule tables for one or more data end nodes (e.g., VMs, VNICs, machines, or other network elements) that connect to the nodes. The network nodes of some embodiments use the AppliedTo tuples in the received AppliedTo firewall rules to identify the data end nodes for which the network nodes need to create the firewall rule tables. The specified firewall rule tables in some embodiments no longer have the AppliedTo tuples.

Examples of such firewall rule tables include VNIC-level firewall tables that a host creates for the VNICs of the VMs that are executing on the host. The VNIC-level firewall rule table contains only the set of rules that are applicable to a particular VM's VNIC, and this set of rules is smaller than the overall number of rules that the host stores for all the VMs executing on it. Having a lot of unnecessary rules in each VNIC table slows the processing of these rules by firewall engine on each packet in/out of the virtual machine. Conversely, due to its smaller size, the VNIC-level firewall rule table is faster to search than a larger, bloated rule table.

In some embodiments, the AppliedTo firewall rules can be specified for different VMs or different logical forwarding elements without instantiating these VMs or forwarding elements. Moreover, before a data end node (e.g., a VM or physical machine) even connects to a firewall-enforcing device, the method of some embodiments distributes the AppliedTo firewall rules to the firewall-enforcing devices that may connect to these data end nodes. For instance, to a host that may potentially execute a VM that belongs to a particular logical network, the method of some embodiments distributes the lower-level AppliedTo firewall rules for the logical network even before the VM has been instantiated on that host. Pushing the AppliedTo firewall rules ahead of time to such a host is advantageous because it allows the host to instantiate a VM and to specify the VNIC- or VM-level firewall table for the VM without interacting with a controller that implements the method of some embodiments.

The above-described methods have several advantages. By using AppliedTos to specify the enforcement point sets for the firewall rules, and applying rule filtering at multiple levels during management-plane provisioning and dataplane deployment, concise, non-bloated firewall rule tables can be easily specified for data end nodes (e.g., VMs, VNICs, etc.). The non-bloated firewall rule tables result in faster processing by the firewall rule engine and hence better performance.

As AppliedTo tuples break the one-to-one mapping between the rule in management level and the dataplane level, AppliedTo firewall rules allow the number of rules in management plane to increase significantly. Unlike traditional firewall rule deployments that do not have efficient controls for specifying whether the rule processing is to be done at source or destination of a packet, AppliedTo firewall rules by definition provide a mechanism for specifying whether the rule is applied at the source of the packet, at the destination of the packet, or both, because the rules contain the location of their enforcement. The applicability of AppliedTo firewall rules to higher level constructs and dynamic constructs allows firewall rules to be easily specified for higher level constructs and to dynamically change the group of elements to which the rules are applicable by changing the membership to the dynamic constructs. As such, AppliedTo firewall rules can be used to easily create firewall rules for a single tenant or a single logical network for a tenant in a multi-tenant environment.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

FIG. 4 illustrates several examples of rule tables.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel method for specifying firewall rules. In some embodiments, the method provides the ability to specify for a particular firewall rule, a set of network node locations (called a set of enforcement points below) at which the particular firewall should be enforced. To provide this ability, the method of some embodiments adds an extra tuple (referred to below as the AppliedTo tuple) to a firewall rule. This added AppliedTo tuple lists the set of enforcement points at which the firewall rule has to be applied (i.e., enforced).

Figure 1:
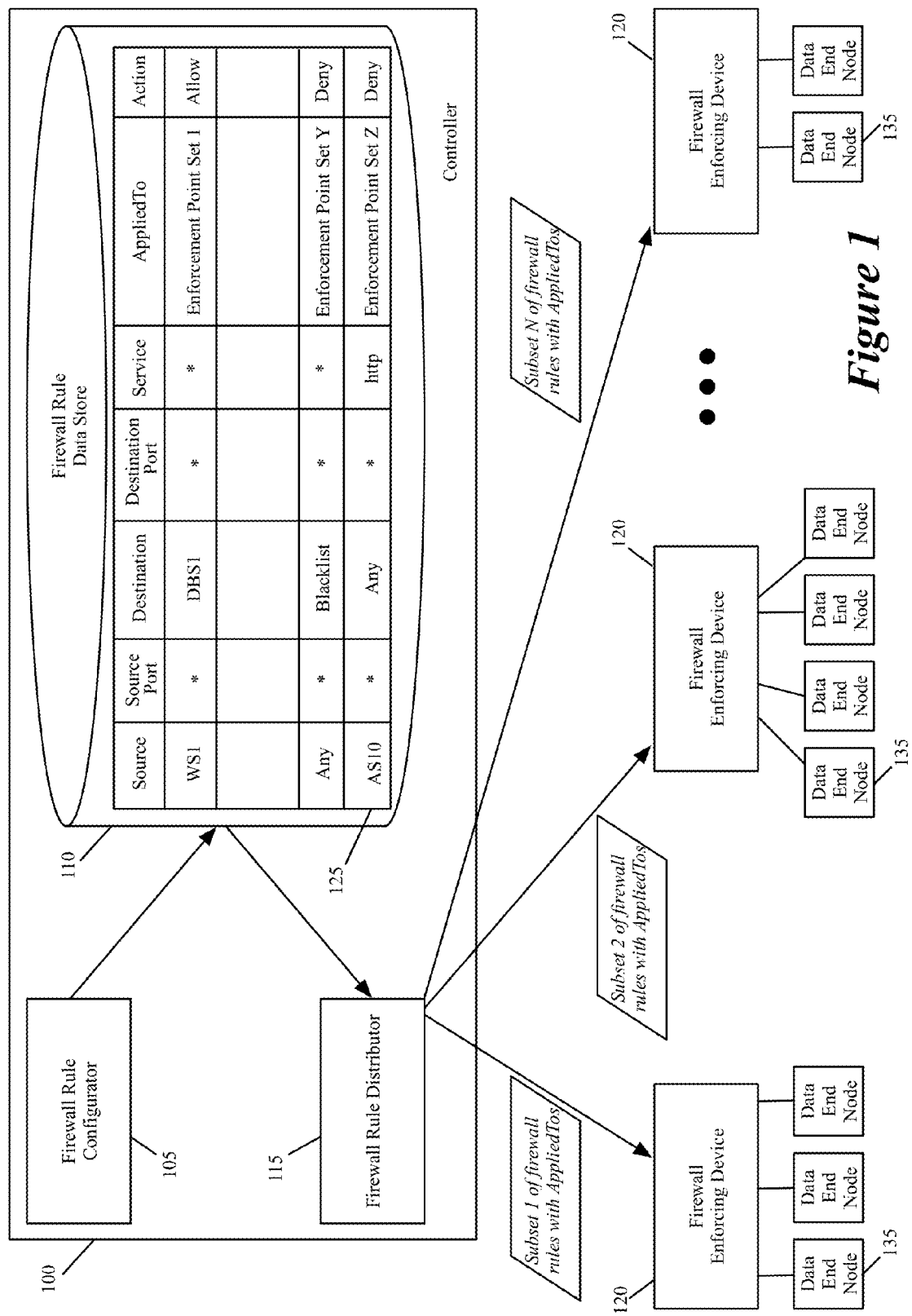
FIG. 1 illustrates a controller that configures and distributes firewall rules with AppliedTo identifiers.

FIG. 1 illustrates a controller 100 that implements such a method. The controller 100 allows AppliedTo firewalls to be configured by users and/or automated processes. This controller also distributes the configured AppliedTo firewall rules to multiple firewall-enforcing devices 120 in a network (not shown) that includes multiple network nodes that are managed by the controller. As shown in FIG. 1, the controller includes a firewall rule configurator 105, a firewall data storage 110, and a firewall rule distributor 115. The firewall rule configurator 105 configures the AppliedTo firewall rules by interacting with users (through one or more user-interface (UI) modules) or with automated processes that are part of firewall provisioning and/or network configuration. This configurator 105 stores the configured AppliedTo rules in the firewall rule data storage 110.

As shown in FIG. 1, the rule configurator 105 specifies each firewall rule 125 in the data storage 110 in terms of n-data tuples for matching a packet with a firewall rule and an action to perform when a packet is matched to the rule. In this document, the term "packet" is to refer to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

In the example illustrated in FIG. 1, the n-data tuples are the six data tuples, Source, Source Port, Destination, Destination Port, Service (also called protocol), and AppliedTo identifiers. One or more of these identifiers may be specified by wildcard value that signifies the applicability of all possible values. As further described below, the AppliedTo identifier specifies the set of enforcement points at which the firewall rule has to be applied (i.e., enforced).

In some embodiments, the source and destination identifiers for L3 level firewall rules are specified in terms of IP addresses, while they are specified in terms of MAC address for L2 level firewall rules. In some embodiments, one or more of the source and destination identifier values can be logical values that are defined for a logical network (e.g., can be IP addresses defined in a logical address space). In other embodiments, all of the identifier values are defined in the physical domains. In still other embodiments, some of the identifier values are defined in logical domain, while other identifier values are defined in the physical domain. Logical networks and logical constructs will be further described below.

To ensure that packets match at least one firewall rule, the rule configurator 105 specifies at least one catchall firewall rule in the data storage 110 that ensures that each packet matches at least one rule when it does not match any other rule in the firewall table. Also, to address situations where a packet might match multiple rules, the rule configurator in some embodiments arranges the rules in the data storage 110 according to a precedence hierarchy that ensures that higher priority rules appear in the storage before lower priority rules. However, given that AppliedTo identifiers can be used to specify different enforcement nodes for different rules, the rule configurator (or a user that acts through the rule configurator) does not have to address precedence orders for firewall rules that are to be sent to different enforcement nodes.

In the example illustrated in FIG. 1, as well as other figures described below, the source and destination port values for the firewall rules are specified as wildcard values. One of ordinary skill will realize that this does not have to be the case for all firewall rules. AppliedTo firewall rules can be specified with respect to traditional port values, such as port 20, 80, 143, etc. Also, in the examples illustrated in the figures, the acronyms WS, AS, and DBS stand for webserver, application server, and database server. These servers can be specified by their associated network addresses (e.g., IP addresses). Also, the example firewall rules in these figures are meant to simply conceptually convey the notion of a firewall rule, as opposed to representing actual firewall rules of a system.

When a firewall engine (not shown) identifies a firewall rule that matches a packet, the engine performs on the packet the act that is specified by the rule's Action identifier. In some embodiments, the Action identifier specifies that the packet should be dropped or allowed to pass through. In other embodiments, other acts may be specified instead of or in conjunction with the drop and allow acts.

As mentioned above, the AppliedTo identifier specifies the set of enforcement points at which the firewall rule has to be applied. In some embodiments, the enforcement points can be defined in terms of (1) VNICs, VMs, hosts, or other compute constructs (e.g., compute clusters, datacenters, etc.), (2) network elements, such as physical forwarding elements (e.g., physical switches, physical routers, etc.), logical forwarding elements (e.g., logical switches, logical routers, etc.), other managed appliances, unmanaged third-party appliances (e.g., third party firewalls), and/or combination of such elements, and/or (3) security groups that are formed by a set of one or more VNICs, VMs, hosts, compute constructs and/or network constructs. By allowing AppliedTo identifiers to be specified in terms of both managed network devices and unmanaged network devices, the firewall configurator 105 provides a single unified interface to manage the entire firewall rule definition for the network that includes both managed and unmanaged devices.

In some embodiments, the AppliedTo tuple can also be set to a wildcard value, which signifies all possible values for the AppliedTo tuple (e.g., all VNICs). As further described below, the AppliedTo identifier in some embodiments can refer to dynamically modifiable constructs, which, in turn, allows the controller to dynamically adjust the firewall rules for different locations within a network by dynamically adjusting the membership of the dynamically modifiable constructs.

As shown in FIG. 1, the controller distributes the AppliedTo firewall rules to various firewall-enforcing devices 120 in the network. In some embodiments, the firewall-enforcing devices include hosts on which multiples VMs execute. In addition to, or instead of, such hosts, the firewall-enforcing devices in some embodiments include other types of firewall-enforcing devices, such as physical forwarding elements, service nodes (e.g., managed dedicated machines or managed VMs), edge appliances (e.g., top-of-rack switches), and third-party appliances.

In some embodiments, the controller distributes some of the AppliedTo firewall rules to some of the nodes with the AppliedTo tuples (that specify the sets of enforcement points associated with the firewall rules), while distributing other firewall rules to other nodes without the AppliedTo tuples. For instance, in some embodiments, the method distributes the AppliedTo firewall rules to hosts with one or more executing VMs, while distributing non-AppliedTo firewall rules to one or more third party appliances that cannot process AppliedTo firewall rules. In other embodiments, however, the method distributes AppliedTo firewall rules to some or all third party appliances as these appliances can process AppliedTo firewall rules. In still other embodiments, the method distributed non-AppliedTo firewall rules (i.e., firewall rules without AppliedTo data tuples) to hosts with one or more executing VMs. In some of these embodiments, the method uses the AppliedTo data tuples to identify the hosts or VMs to which it has to forward the firewall rules.

The firewall-enforcing devices 120 connect to one or more data end nodes 135, which can include different types of end nodes in different embodiments. Examples of such data end nodes include VMs and non-VM addressable nodes (e.g., volume mounters (iSCSI mounter, NFS mounter, etc.), VM migrators (e.g., vMotion module used in the ESX hypervisor of VMware Inc.), and hypervisor kernel network interface (e.g., vmknic of VMware Inc.)). For each data end node, or for a set of data end nodes, the firewall-enforcing devices 120 in some embodiments generate custom firewall data storages (e.g., firewall rule tables) based on the received AppliedTo firewall rules. To generate the custom firewall data storages, the firewall-enforcing devices use the AppliedTo identifiers of the received AppliedTo firewall rules to identify the firewall rule to store in the different custom firewall data storages.

For instance, in some embodiments, a multi-VM host that receives the AppliedTo firewall rules specifies multiple firewall rule tables for multiple VNICs of the VMs based on the AppliedTo identifiers of the firewall rules. The specified VNIC-level firewall rule tables in some embodiments no longer have the AppliedTo tuples. In some embodiments, the VNIC-level firewall rule table contains only the set of rules that are applicable to the VNIC's VM, and this set of rules is smaller than the overall number of rules that the host stores for all the VMs executing on it. Also, each rule in the VNIC-level firewall rule table is specified in terms of six tuples, which are the Source, Source Port, Destination, Destination Port, Service, and Action identifiers.

In some embodiments, the firewall-enforcing devices 120 connect directly to the data end nodes 135, or indirectly through one or more forwarding elements. Through their connections to the data end nodes, the firewall-enforcing devices 120 receive packets to and from the data end nodes. The enforcing devices 120 of some embodiments compare the attributes of the received packets with the firewall rules (e.g., with the five data tuples, Source, Source Port, Destination, Destination Port, and Service identifiers of the firewall rules) in the custom firewall data storages that the enforcing devices have created for the source or destination node of the packet. Based on this comparison, the enforcing devices identify a firewall rule corresponding to the packet, and then perform the action specified by the identified firewall rule.

Figure 2:
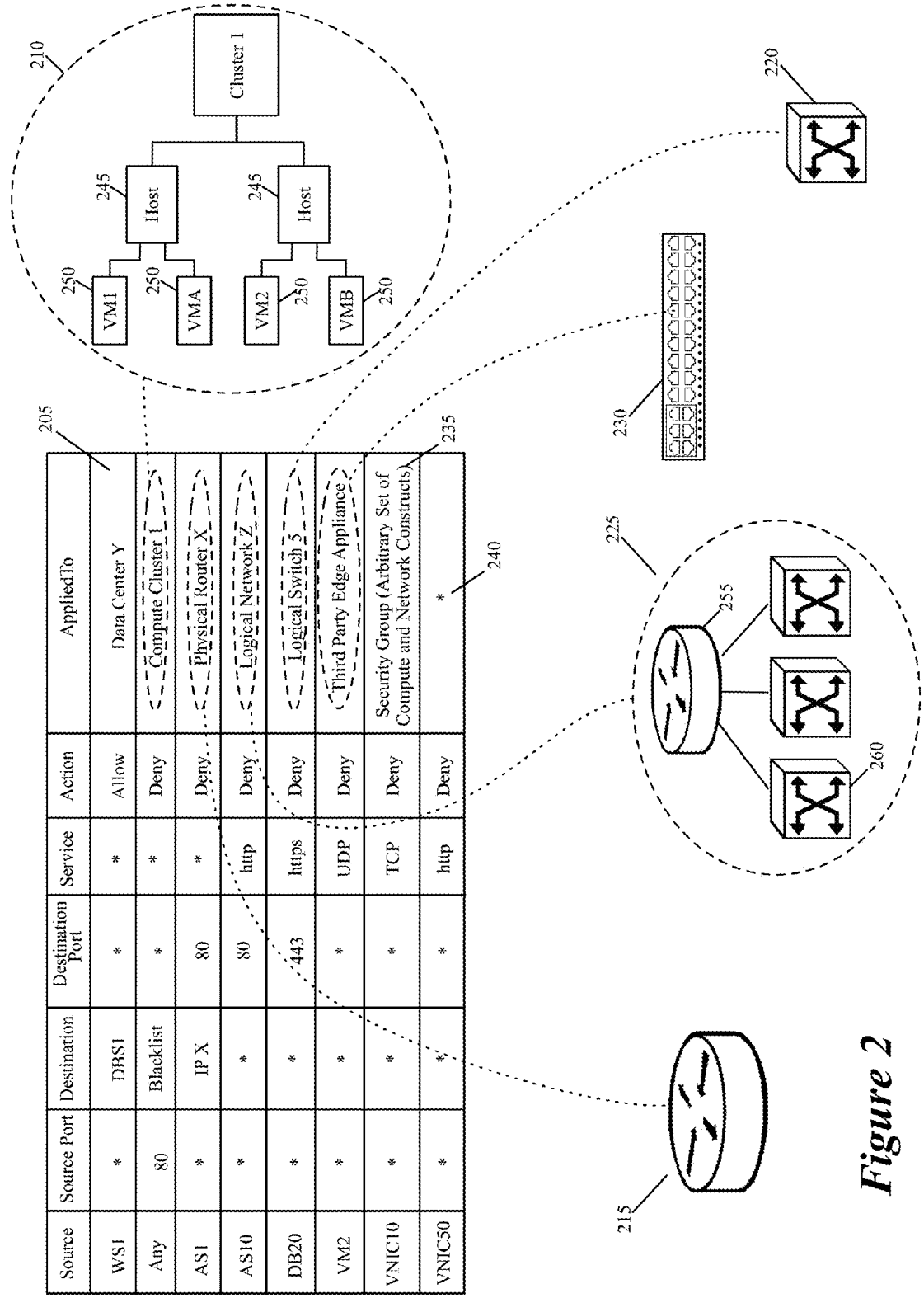
FIG. 2 illustrates several examples of enforcement points that are used to specify the AppliedTo tuples in some embodiments.

FIG. 2 illustrates several examples of enforcement points that are used to specify the AppliedTo tuples in some embodiments. Specifically, this figure illustrates several examples of AppliedTo firewall rules 125 that are configured and stored by the controller 100 of some embodiments. As before, each of these rules includes the traditional five tuples, Source, Source Port, Destination, Destination Port, and Service, in addition to the AppliedTo tuple and the Action value.

The examples of the AppliedTo tuples that are shown in FIG. 2 include (1) compute constructs, such as data center 205 and compute cluster 210, (2) network constructs, such as physical router 215, logical switch 220, and logical network 225, (3) third-party network appliance 230, (4) a security group 235, and (5) a wildcard entry 240.

In some embodiments, a datacenter is a location that houses multiple hosts, each of which might be dedicated to one tenant or multiple tenants. Each host might be a dedicated non-virtualized machine, or it might be a virtualized machine on which multiple VMs execute. A compute cluster is a group of hosts in a datacenter. FIG. 2 illustrates an example of a compute cluster that is formed by two hosts 245 that each executes two VMs 250. In some embodiments, each host in a compute cluster is configured to support a set of tenants, so that when a VM is instantiated on or moved to one such host, some or all of the data needed for configuring that VM and configuring the VNIC-level firewall data storage on the host already exists on the host.

In some embodiments, each physical forwarding element (PFE) is a forwarding element that exists in the physical world. FIG. 2 illustrates the physical router 215 as an example of a PFE. Examples of such a PFE include a switch, a router, a firewall appliance, a load balancer, etc. In some embodiments, all such physical devices (switches, routers, firewall appliances, load balancers, etc.) can be standalone hardware devices, hardware devices that are implemented by the physical NICs of the hosts, or software devices that execute on shared or dedicated hosts.

In this document, software-forwarding elements are referred to as physical forwarding elements (PFEs), in order to distinguish them from logical forwarding elements, which are logical constructs that are not tied to the physical world. In other words, the software forwarding elements are referred to as PFEs because they exist and operate in the physical world, whereas logical forwarding elements are simply a logical representation of a forwarding element that is presented to a user or a program in some embodiments.

In some embodiments, software forwarding elements executing on different host devices (e.g., different computers) are configured to implement different logical forwarding elements (LFEs) for different logical networks of different tenants, users, departments, etc. that use the same shared compute and networking resources. For instance, two software forwarding elements executing on two host devices can perform L2 switching functionality. Each of these software switches can in part implement two different logical L2 switches, with each logical L2 switch connecting the VMs of one entity. In some embodiments, the software forwarding elements provide L3 routing functionality, and can be configured to implement different logical routers with the software L3 routers executing on other hosts. FIG. 2 illustrates a logical switch 220 as an example of a logical forwarding element. Logical forwarding elements are further described in U.S. patent application Ser. No. 14/070,360, now published as U.S. Patent Publication 2015/0058968, which is incorporated herein by reference.

A logical network is a network that is formed by one or more logical forwarding elements. FIG. 2 illustrates an example of a logical network 225 that is formed by one logical router 255 and three logical switches 260. Like logical forwarding elements, logical networks are a logical representation of a network that is presented to a user or a program in some embodiments. Although not shown in the example illustrated in FIG. 2, the AppliedTo tuple can also specify a physical network (that is formed by one or more PFEs) as an enforcement point for a firewall rule.

In a network that includes multiple physical forwarding elements that are managed by one or more controllers (e.g., managed by the controllers to implement one or more LFEs), third-party appliances are forwarding elements that are not managed or are minimally managed by the controller(s). For instance, in multi-tenant hosted environment of some embodiments, multiple controllers manage multiple physical forwarding elements that operate at the edge of the network (i.e., manage PFEs that execute on the hosts or directly connect to the hosts). The connection between the PFEs on the edge, however, traverses through internal network fabric that includes third-party appliances (such as third-party top-of-rack switches). In some managed networks of some embodiments, the managed forwarding elements include both managed edge forwarding elements and managed non-edge forwarding elements. In some of these embodiments, the managed non-edge forwarding elements perform functions that are not readily handled by the managed edge forwarding elements in those embodiments. These non-edge forwarding elements are referred to as service nodes in some embodiments.

In some embodiments, AppliedTo tuples can specify the enforcement points in terms of security groups that are formed by grouping one or more VNICs, VMs, hosts, compute constructs and/or network constructs. For instance, an AppliedTo firewall rule can be limited (by the AppliedTo tuple) to a security group that is specified in terms of a particular compute cluster and a particular logical network that connects a particular tenant's VMs that execute on the cluster's hosts. Security groups can be specified by users (e.g., network administrators) in some embodiments. Conjunctively, or alternatively, security groups can be specified by automated process in some embodiments. As shown by entry 240, a wildcard value can also specify an AppliedTo tuple. The wildcard value in some embodiments signifies all possible values for the AppliedTo tuple (e.g., all VNICs).

The AppliedTo identifier in some embodiments can refer to dynamically modifiable constructs, which, in turn, allows the controller to dynamically adjust the firewall rules for different locations within a network by dynamically adjusting the membership of the dynamically modifiable constructs. In some embodiments, one or more of the compute constructs, network constructs and security groups can be specified as dynamic containers that can have members (e.g., forwarding elements, hosts, VNICs, etc.) dynamically added and/or removed from them. When a dynamic container is used to define the AppliedTo tuple(s) of one or more firewall rules is modified, the controller of some embodiments does not resend the firewall rule to the affected network nodes, but instead only sends the updated membership change to the group that is defined by the dynamic container.

Figure 3:
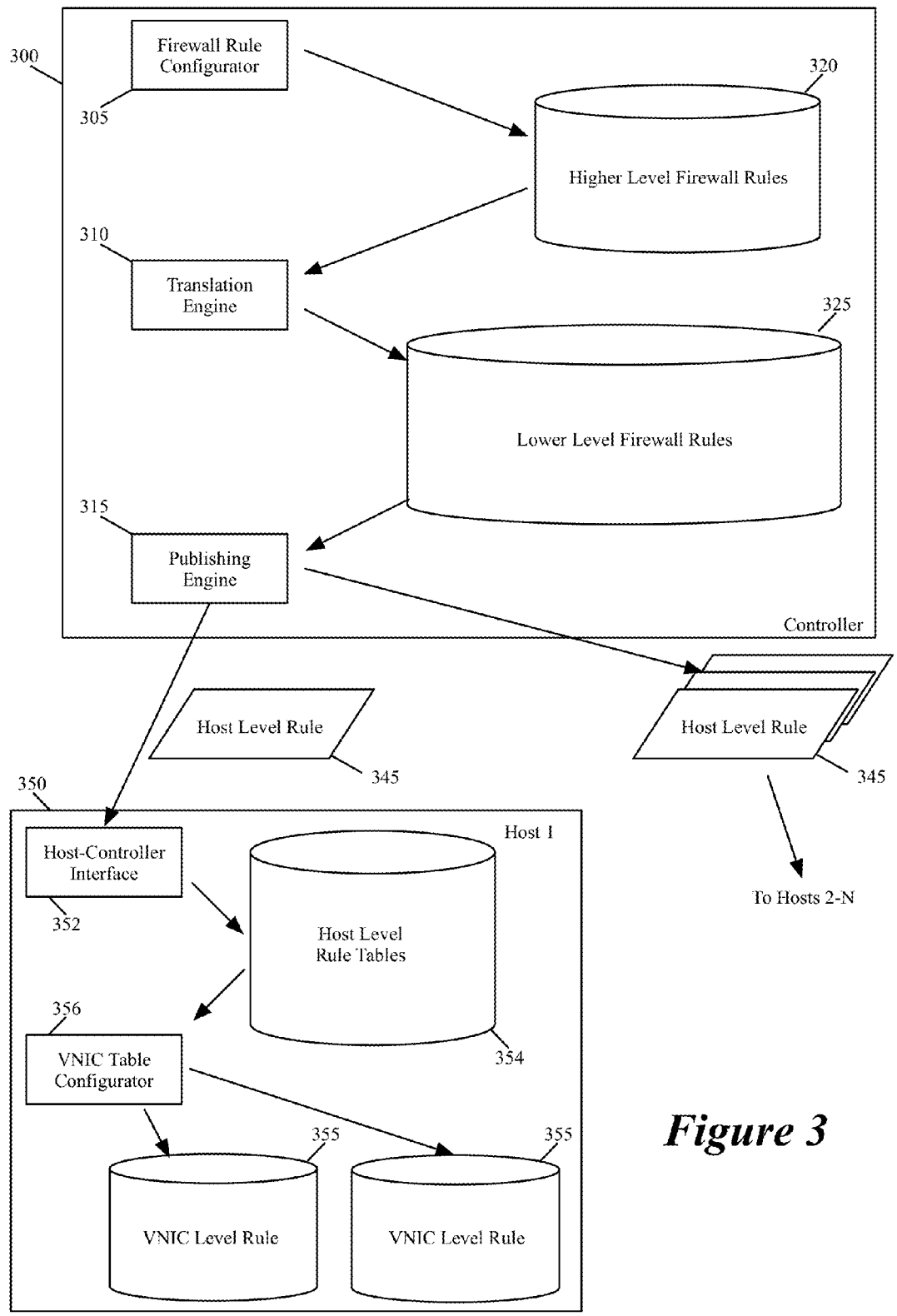
FIG. 3 illustrates another controller that specifies and distributes AppliedTo firewall rules.

The controller of some embodiments allows the AppliedTo firewall rules (1) to be specified (e.g., by a network administrator or by an automated firewall configurator) in terms of higher-level enforcement point identifiers, but then (2) to be distributed in terms of lower-level enforcement point identifiers that are decipherable or easier to decipher by the firewall-enforcing devices. FIG. 3 illustrates one such controller 300, as well as one host 350 that receives firewall rules that are distributed by the controller 300. As shown in this figure, the controller 300 includes a firewall rule configurator 305, a translation engine 310, a publishing engine 315, a high-level rule data storage 320, and a low-level rule data storage 325. The example illustrated in FIG. 3 will be described by reference to FIG. 4, which illustrates several firewall rule tables that are created by the controller 300 and the host 350 in some embodiments of the invention.

Like the firewall rule configurator 105, the firewall rule configurator 305 configures the AppliedTo firewall rules by interacting with users (through one or more user-interface (UI) modules) and/or automated processes. The firewall rule configurator 305 allows users or automated processes to specify AppliedTo firewall rules in terms of high-level enforcement point identifiers. Examples of such high-level enforcement point identifiers are the high-level network, compute, and security constructs, such as logical switches, logical routers, logical networks, physical networks, compute clusters, datacenters, etc.

The configurator 305 stores the AppliedTo firewall rules that it configures in the rule data storage 320. FIG. 4 illustrates an example of a high-level firewall rule table 405 that the controller configures and stores in the high-level data storage 320 of some embodiments. As shown, the high-level firewall rule table 405 stores multiple AppliedTo firewall rules that have AppliedTo identifiers defined in terms of high-level constructs, such as a compute cluster, a datacenter, and a logical switch.

From the rule data storage 320, the translation engine 310 retrieves the AppliedTo firewall rules, and converts the high-level enforcement point identifier in the AppliedTo tuples of the retrieved rules to lower-level enforcement point identifiers. For instance, in some embodiments, the translation engine converts compute constructs (e.g., datacenter identifiers, compute cluster identifiers, host identifiers, etc.) and network constructs (e.g., LFE identifiers, logical network identifiers, etc.) into VNIC values (VNIC identifiers) and wildcard values. FIG. 4 illustrates an example of a low-level firewall rule table 410. As shown, this table 410 contains the same firewall rules as the high-level firewall rule table 405 but each rule's AppliedTo identifier now specifies either a wildcard value 412 or a set of VNICs associated with the high-level identifiers.

In so converting the enforcement point identifiers, the translation engine 310 ensures that all AppliedTo firewall rules are defined by low-level enforcement point identifiers that can be deciphered by all firewall-enforcing devices that receive the AppliedTo firewall rules. The translation engine stores the AppliedTo firewall rules that it retrieves, and when necessary converts, in the rule data storage 325.

In some embodiments, the translation engine 310 translates other parameters of the firewall rules from the data storage 320 before storing the translated rules in the data storage 325. For instance, in some embodiments, the source and destination identifiers of the firewall rules might be specified in terms of high-level constructs (e.g., containers such as web server, app server, database server, etc.) that have to be converted to lower-level identifiers (e.g., specific IP addresses) before distributing the firewall rules to the firewall-enforcing devices.

One of ordinary skill in the art will realize that the translation engine operates differently in other embodiments. For instance, in some embodiments, the translation engine does not translate, or does not always translate, high-level source and destination identifiers to low-level source and destination identifiers. In some of these embodiments, the translation engine leaves this translation to some or all of the firewall-enforcing devices to do. Similarly, in some embodiments, the translation engine does not translate, or does not always translate, high-level AppliedTo identifiers to low-level AppliedTo identifiers for some or all of the firewall-enforcing devices, because the translation engine leaves this translation to some or all of the firewall-enforcing devices to do. Foregoing some or all of translation of the high-level firewall identifiers (e.g., AppliedTo, source and destination identifiers), simplifies the size and/or number of firewall rules that the controller distributes to the enforcing devices, but comes at the expense of requiring the enforcing devices to have the capability (e.g., the network state information) to perform this translation.

Even in some embodiments that have the controller distribute firewall rules with low-level AppliedTo identifiers (e.g., with only VNIC and wildcard values), the controller may not use a translation engine 310 that unpacks (i.e., converts) the high-level AppliedTo identifiers (e.g., the high-level network, compute, and/or security constructs) into low-level AppliedTo identifiers. For instance, each high-level AppliedTo identifier (e.g., each compute cluster identifier, LFE identifier, etc.) is specified as an object with a reference to a list of VNIC values. In some of these embodiments, the translation engine's job is to populate the VNIC list of the high-level identifier object with the identities or references to wildcard values or the VNICs that are members of the high-level AppliedTo identifier (e.g., are members of the compute cluster, the LFE, etc.). In some embodiments, the rule configurator 305 so populates the VNIC list, and hence in these embodiments, a translation engine is not used for any processing associated with the high-level AppliedTo identifiers.

For each data end node that should receive AppliedTo firewall rules, the publishing engine 315 (1) collects host-level AppliedTo rules 345 from the low-level data storage 325, and (2) distributes the collected firewall rules to the data end nodes. FIG. 3 shows the publishing engine distributing firewall rules to multi-VM hosts. However, one of ordinary skill in the art will realize that the publishing engine 315 is used to distribute firewall rules to other firewall-enforcing devices in other embodiments.

For each host, the publishing engine 315 identifies and retrieves from the lower-level data storage 325, the AppliedTo rules that pertain to the host. In some embodiments, the publishing engine only sends to each host the AppliedTo rules that pertain to the host. These AppliedTo rules in some embodiments include the AppliedTo rules that relate to VMs that are executing on the host. FIG. 4 illustrates an example of a host-level firewall rule table 415 that the publishing engine distributes to a host in some embodiments. This table only includes the AppliedTo firewall rules that are applicable to the recipient host. As such, this table is typically much smaller than the high-level and low-level AppliedTo tables 405 and 410, because this table 415 contains AppliedTo rules that pertain to one host.

In some embodiments, the rules that pertain to each host also include the AppliedTo rules that relate to VMs that may be instantiated on the host. For instance, when a particular host belongs to a compute cluster that implements a particular logical network, the publishing engine 315 of some embodiments pushes the AppliedTo rules for the logical network to the particular host even before a VM that belongs to the logical network is instantiated on the particular host. Pushing the AppliedTo firewall rules ahead of time to such a host is advantageous because it allows the host to configure the firewall rules for the VM without interacting with a controller. Such configuration of the firewall rules is referred to below as headless provisioning of the firewall rules as it does not require interaction with a controller.

In some embodiments, the publishing engine 315 collects the AppliedTo rules 345 for each host by examining the higher-level AppliedTo data storage 320. For instance, some embodiments do not define a lower-level AppliedTo data storage 325. In these embodiments, the publishing engine 315 sifts through the higher-level AppliedTo data storage 320 to identify AppliedTo firewall rules that are applicable to a host.

Also, even though FIGS. 3 and 4 illustrate the creation and distribution of host-level AppliedTo rule sets to different hosts, one of ordinary skill in the art will realize that in other embodiments the publishing engine 315 examines the controllers AppliedTo data storage(s) to identify and publish firewall rule sets to non-host firewall-enforcing devices (such as third-party firewall devices). The publishing engine (1) only publishes non-AppliedTo firewall rules (i.e., rules without the AppliedTo identifier) to the non-host firewall-enforcing devices in some embodiments, (2) only publishes AppliedTo firewall rules (i.e., rules with AppliedTo identifiers) to the non-host firewall-enforcing devices in other embodiments, and (3) publishes non-AppliedTo firewall rules to some non-host firewall-enforcing devices while publishing AppliedTo firewall rules to other non-host firewall-enforcing devices.

Each host 350 has a host-controller interface 352 that receives and stores the host-level rules in a host-level rules table 354. Each host also has a VM firewall configurator that from the host-level rules that are stored in the host-level rules tables 354 identifies and stores a subset of firewall rules for each VM that is executing on the host. In the embodiments illustrated in FIG. 3, the VM firewall configurator is a VNIC-table configurator 356 that generates one VNIC-level firewall rule set for each VNIC of each VM, by (1) using the AppliedTo data tuples in the host-level rules 354 to identify the firewall rules that are applicable to the VNIC, (2) retrieving the identified rules from the host-level rules, and (3) storing the retrieved rules in the VNIC-level firewall data storage 355 for the VNIC. In some embodiments, each VM has one VNIC. However, in other embodiments, some or all VMs can have more than one VNIC.

FIG. 4 illustrates an example of a VNIC-level firewall rule table 420. As shown in this table, the firewall rules in the VNIC-level firewall rule table do not include the AppliedTo tuple, and are each specified only in terms of five tuples (Source, Source Port, Destination, Destination Port, and Service identifiers) and the action value. As the VNIC-level firewall rule table contains only the set of rules that are applicable to a particular VNIC, this set of rules is smaller than the overall number of rules that the host stores for all the VMs executing on it. This smaller size allows for faster processing of the firewall rules by a firewall rule engine (not shown) of a host.

The above-described firewall rule distribution methodologies have several advantages. By using AppliedTos to specify the enforcement point sets for the firewall rules, and applying rule filtering at multiple levels during management-plane provisioning and dataplane deployment, these methodologies allow concise, non-bloated firewall rule tables to be easily specified for data end nodes (e.g., VMs, VNICs, etc.). Also, the non-bloated firewall rule tables result in faster processing by the firewall rule engine and hence better performance.

Section I below describes several more detailed examples of the controllers of some embodiments. Section II then describes several more detailed examples of multi-VM hosts of some embodiments. Section III next describes the network control system of some embodiments of the invention. Lastly, Section IV describes electronic devices that are used to implement the controller and/or hosts of some embodiments of the invention.

I. Controller Architecture and Operation

Figure 5:
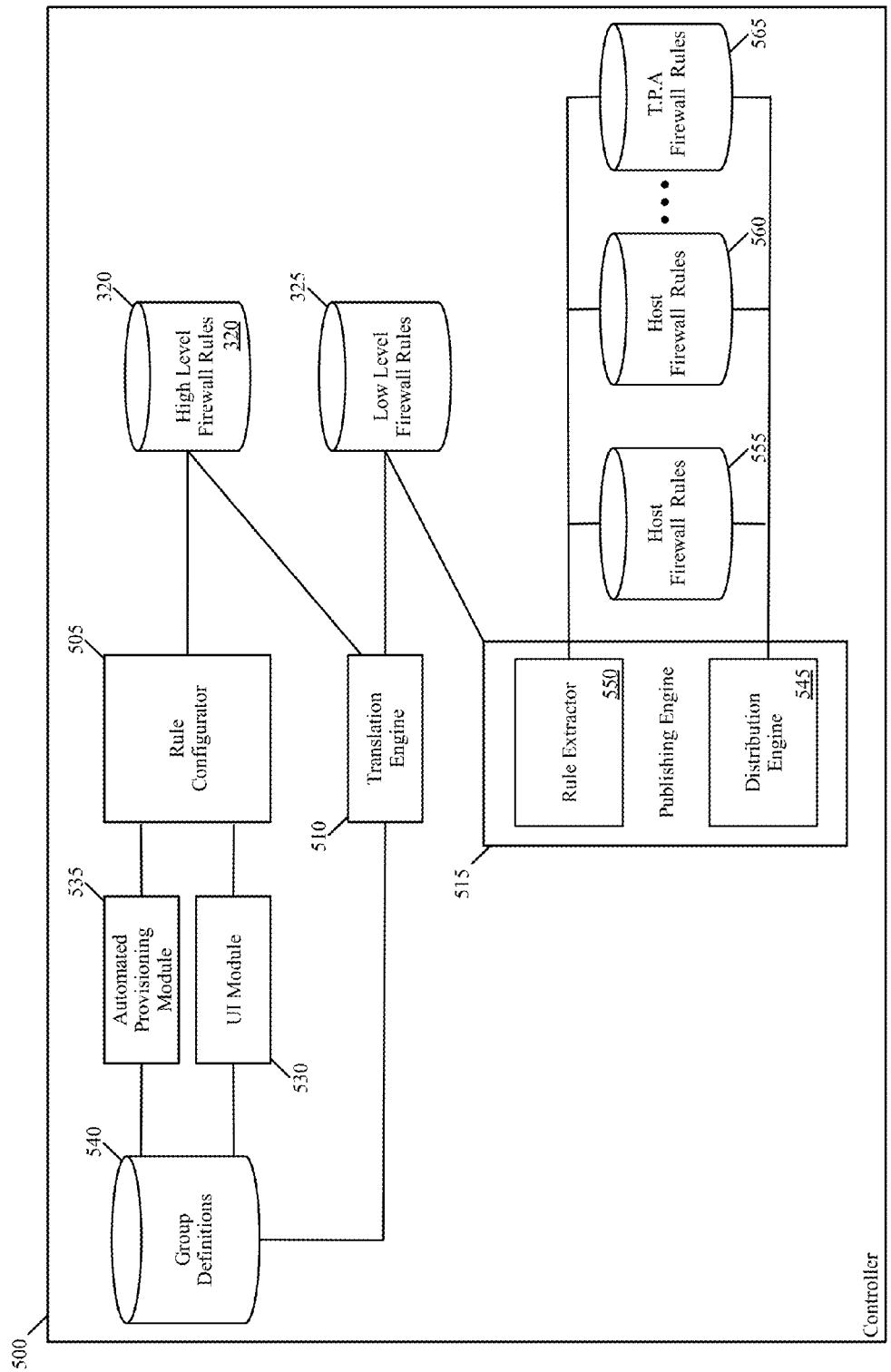
FIG. 5 illustrates another controller that specifies and distributes AppliedTo firewall rules.

FIG. 5 illustrates a controller 500 of some embodiments of the invention. Like controller 300 of FIG. 3, the controller 500 can configure AppliedTo firewall rules in terms of higher-level enforcement point identifiers, but distributes the AppliedTo firewall rule in terms of lower-level enforcement point identifiers. Also, like the controller 300, the controller 500 includes a rule configurator 505, a translation engine 510, a publishing engine 515, a high-level data storage 320, and a low-level data storage 325. In addition to these components, FIG. 5 illustrates the controller 500 to include a user interface (UI) module 530, an automated provisioning module 535, a group-definition data storage 540, and several enforcing-device data storages 555, 560 and 565.

The firewall rule configurator 505 configures the AppliedTo firewall rules by interacting with users (e.g., network administrators) through the UI module 530. It also configures the AppliedTo firewall rules at the direction of automated provisioning module 535 that directs the configurator to specify these rules as part of the provisioning of a physical or logical network. For instance, when the controller 500 is part of a network control system that manages logical networks in a multi-user (e.g., multi-tenant) hosted environment, the provisioning module 535 in some embodiments directs the configurator 505 to specify at least some of the AppliedTo firewall rules when a logical network is being specified for one user (e.g., for one tenant).

The configurator 505 allows users (through the UI module 530) or the provisioning module 535 to specify AppliedTo firewall rules in terms of high-level enforcement point identifiers. Examples of such high-level enforcement point identifiers are the high-level network, compute, and security constructs, such as logical switches, logical routers, logical networks, physical networks, compute clusters, datacenters, etc. The configurator 505 stores the AppliedTo firewall rules that it configures in the rule data storage 320.

From the rule data storage 320, the translation engine 510 retrieves the AppliedTo firewall rules, and converts the high-level enforcement point identifiers in the AppliedTo tuples of the retrieved rules to lower-level enforcement point identifiers. For instance, in some embodiments, the translation engine converts compute constructs (e.g., datacenter identifiers, compute cluster identifiers, host identifiers, etc.), network constructs (e.g., LFE identifiers, logical network identifiers, etc.), and security groups (formed by one or more network or compute constructs) into VNIC and wildcard values. In so converting the enforcement point identifiers, the translation engine 510 ensures that all AppliedTo firewall rules are defined by low-level enforcement point identifiers that can be deciphered by all firewall-enforcing devices that receive the AppliedTo firewall rules. The translation engine stores the AppliedTo firewall rules that it retrieves, and when necessary converts, in the low level rule data storage 325.

To convert high-level enforcement point identifiers (e.g., the high-level network construct, compute construct, and security groups) to low-level enforcement point identifiers (e.g., to VNIC and wildcard values), the translation engine relies on the definition of the high-level groups that are stored in the group definition data storage 540. These definitions are stored by a user (through the UI module 530) or by the automated provisioning module 535.

In some embodiments, these definitions are statically defined. In other embodiments, some or all of the high-level group definitions are dynamically modifiable by a user or the provisioning module 535. Specifically, the AppliedTo identifier in some embodiments can refer to dynamically modifiable constructs, which, in turn, allows the controller 500 to dynamically adjust the firewall rules for different locations within a network by dynamically adjusting the membership of the dynamically modifiable constructs. In some embodiments, the rule configurator 305 can specify one or more of the compute constructs, network constructs and security groups as dynamic containers that can have members (e.g., forwarding elements, hosts, VNICs, etc.) dynamically added and/or removed from them.

For enforcement points that are defined by reference to static or dynamic groups, the translation engine 510 (1) uses the group definitions in the data storage 540 to identify the low-level identifiers (e.g., the VNIC and wildcard values) associated with the high-level identifiers, (2) substitutes the high-level identifiers with the identified low-level identifiers, and (3) stores the resulting rules in the data storage 325. When a dynamic container that is used to define the AppliedTo tuple(s) of one or more firewall rules is modified, the translation engine updates the low-level enforcement point identifiers of the affected firewall rules. As further described below, the publishing engine 515 then sends the updated membership change for the affected firewall rules to the firewall-enforcing devices that need to be informed of this membership change. This approach foregoes the need to resend the affected firewall rules to the firewall-enforcing devices that previously received these rules. However, the publishing engine will send an affected firewall rule to a new firewall-enforcing device when the membership change to a dynamic container requires the addition of a new firewall-enforcing device.

Like the translation engine 310 of the controller 300, the translation engine 510 of controller 500 translates other parameters (e.g., source and destination identifiers) of the firewall rules from the data storage 320 before storing the translated rules in the data storage 325. Also, like the translation engine of the controller 300, the translation engine 510 of the controller 500 operates differently in other embodiments. For instance, in some embodiments, the translation engine leaves some or all of the translation of the high-level constructs of the firewall rules of the data storage 320 to some or all of the firewall-enforcing devices to do.

Also, even in some embodiments that have the controller 500 distribute firewall rules with low-level AppliedTo identifiers (e.g., with only VNIC and wildcard values), the controller 500 does not use the translation engine 510 to unpack (i.e., to convert) the high-level AppliedTo identifiers (e.g., the high-level network, compute, and/or security constructs) into low-level AppliedTo identifiers. For instance, in some embodiments that specify each high-level AppliedTo identifier (e.g., each compute cluster identifier, LFE identifier, etc.) as an object with a reference to a list of VNIC values, the translation engine's job is to populate the VNIC list of the high-level identifier object with the identities or references to wildcard values or the VNICs that are members of the high-level AppliedTo identifier (e.g., are members of the compute cluster, the LFE, etc.). In some embodiments, the rule configurator 305 so populates the VNIC list (e.g., by reference to the group definitions in the data storage 540), and hence in these embodiments, a translation engine will not be needed for any processing associated with the high-level AppliedTo identifiers.

The publishing engine 515 collects and distributes enforcing-device AppliedTo rules from the low-level data storage 325. As shown in FIG. 5, the publishing engine 515 includes a rule extractor 550 and a distribution engine 545. For each firewall-enforcing device, the rule extractor 550 identifies and retrieves from the lower-level data storage 325, the AppliedTo rules that pertain to the enforcing device. The rule extractor 550 stores the retrieved firewall rules for each particular firewall-enforcing device in a data storage (e.g., data storages 555, 560, and 565) that the publishing engine maintains for the particular firewall-enforcing device.

In some embodiments, the rule extractor 550 only retrieves and stores for each firewall-enforcing device the AppliedTo rules that pertain to that firewall-enforcing device. As such, the enforcing-device data storages (e.g., data storages 555, 560, and 565 that store the firewall rules for each firewall-enforcing device) are typically much smaller than the high-level and low-level data storages 320 and 325, because the enforcing-device data storages contain only AppliedTo rules that pertain to their respective enforcing device.

In some embodiments, the AppliedTo firewall rules that pertain to a firewall-enforcing device include the AppliedTo rules that relate to data end nodes (e.g., the VMs or the VM VNICs) that are connected to the firewall-enforcing device. In some embodiments, the rules that pertain to each firewall-enforcing device also include the AppliedTo rules that relate to data end nodes that may be connected to the firewall-enforcing device. For instance, when a particular host belongs to a compute cluster that implements a particular logical network, the rule extractor 550 of some embodiments stores, in a data storage for the particular host, the AppliedTo rules that are specified for the logical network even before a VM that belongs to the logical network is instantiated on the particular host. Pushing the AppliedTo firewall rules ahead of time to such a host is advantageous because it allows the host to configure the firewall rules for the VM without interacting with a controller.

In some embodiments, the rule extractor 550 collects the AppliedTo rules for each enforcing device by examining the higher-level AppliedTo data storage 320. For instance, some embodiments do not define a lower-level AppliedTo data storage 325. In these embodiments, the rule extractor 550 sifts through the higher-level AppliedTo data storage 320 to identify AppliedTo firewall rules that are applicable to a firewall-enforcing device.

FIG. 5 shows three of the data storages 555, 560, and 565 that the rule extractor 550 maintains. Two of these data storages 555 and 560 are for hosts that execute firewall engines that serve as firewall-enforcing devices for the VMs executing on the hosts. The third data storage 565 is for a third party firewall appliance. The publishing engine (1) only publishes non-AppliedTo firewall rules (i.e., rules without the AppliedTo identifier) to the non-host firewall-enforcing devices in some embodiments, (2) only publishes AppliedTo firewall rules to the non-host firewall-enforcing devices in other embodiments, and (3) publishes non-AppliedTo firewall rules to some non-host firewall-enforcing devices while publishing AppliedTo firewall rules to other non-host firewall-enforcing devices.

Accordingly, in some embodiments, the rule extractor removes the AppliedTo identifiers for all firewall rules that are to be published to non-host firewall-enforcing devices, before storing the firewall rules in the data storages (e.g., data storage 565) that it maintains for these devices. In other embodiments, the rule extractor stores the firewall rules with their AppliedTo identifiers in the data storages (e.g., data storage 565) that it maintains for the non-host firewall-enforcing devices. In still other embodiments, the rule extractor stores the firewall rules without their AppliedTo identifiers for some non-host firewall-enforcing devices while storing the firewall rules with their AppliedTo identifiers for other non-host firewall-enforcing devices.

In some embodiments, the distribution engine 545 of the publishing engine 515 pushes to each firewall-enforcing device (through a network) the firewall rules that are stored in the data storage that the rule extractor maintains for the firewall-enforcing device. In other embodiments, the firewall-enforcing devices pull the firewall rules from the distribution engine. In still other embodiments, the distribution engine pushes the firewall rules to some of the firewall-enforcing devices, while serving as a resource to pull firewall rules for other firewall-enforcing devices.

As mentioned above, the publishing engine distributes to the firewall-enforcing devices updates to AppliedTo enforcement point sets when a user or an automated process dynamically modifies such sets. Such modifications cause the translation engine in some embodiments to update the firewall rules in the lower-level data storage 325. This, in turn, can cause the rule extractor to update the AppliedTo fields in one or more rules in one or more enforcing-device data storages that it maintains for the firewall-enforcing devices. Updates to the firewall rules in the lower-level data storage can also cause the rule extractor to create a new firewall rule for a newly specified enforcement point (i.e., a firewall-enforcing device that is added as an enforcement point for a previously specified AppliedTo firewall rule in the data storage 325). The distribution engine then distributes (e.g., through push or pull actions) the updated AppliedTo memberships and/or newly added firewall rules to the affected firewall-enforcing devices.

Figure 6:
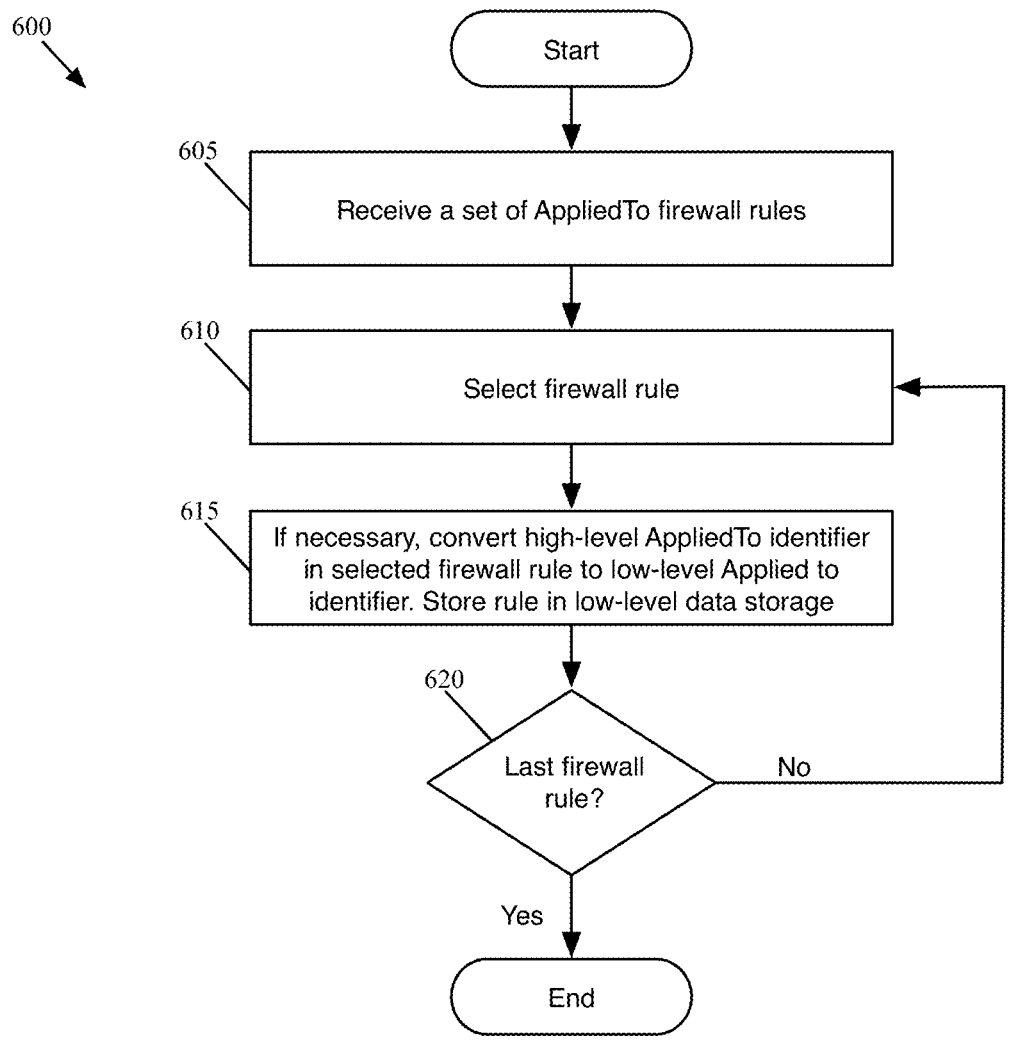
FIGS. 6-9 illustrate processes for several operations of the controller of FIG. 5 in some embodiments.

The operation of the controller 500 in some embodiments will now be described by reference to FIGS. 6-9. FIG. 6 illustrates a process 600 that the translation engine 610 of the controller 600 performs in some embodiments. The process 600 in some embodiments is performed each time a set of AppliedTo firewall rules are stored in the high-level data storage 320. In some embodiments, the process 600 is performed as a batch process, while in other embodiments it is performed in real-time upon receiving a notification of the storage of the set of AppliedTo firewall rules in the high-level data storage 320.

As shown in FIG. 6, the process initially receives (at 605) the identity of the set of AppliedTo firewall rules that have been added to the high-level data storage. These rules may be specified in terms of high-level AppliedTo identifiers (e.g., high-level compute constructs, network constructs, and/or security groups) or low-level AppliedTo identifiers (e.g., VNIC and wildcard values).

The process then selects (at 610) one of the AppliedTo firewall rules in the received set. Next, at 615, the process determines whether the selected AppliedTo firewall rule has an AppliedTo identifier that is defined in terms of at least one high-level construct. If so, the process converts (at 615) the high-level AppliedTo identifier to a low-level AppliedTo to identifier. To convert high-level AppliedTo identifiers (e.g., the high-level network construct, compute construct, and security groups) to low-level AppliedTo identifiers (e.g., to VNIC and wildcard values), the process 600 relies on the definitions of the high-level groups that are stored in the group definition data storage 540. Specifically, for AppliedTo identifiers that are defined by reference to groups defined in the data storage, the process 600 (1) uses the group definitions in the data storage 540 to identify the low-level identifiers (e.g., the VNIC and wildcard values) associated with the high-level identifiers, (2) substitutes the high-level identifiers in the AppliedTo firewall rule with the identified low-level identifiers, and (3) stores the resulting rules in the data storage 325. At 615, the process in some embodiments translates other parameters (e.g., source and destination identifiers) of the firewall rules (from the data storage 320) before storing the translated rules in the data storage 325.

At 620, the process determines whether it has examined all the AppliedTo firewall rules in the set received at 605. If not, the process returns to 610 to select another AppliedTo firewall rule, and then performs the operation 615 to translate this rule to a lower-level rule, if such a translation is necessary. When the process determines (at 620) that it has examines all the AppliedTo firewall rules in the received set, it ends.

In this manner, the process 600 converts high-level compute constructs (e.g., datacenter identifiers, compute cluster identifiers, host identifiers, etc.), network constructs (e.g., LFE identifiers, logical network identifiers, etc.), and security groups (formed by one or more network or compute constructs) in the AppliedTo firewall rule, into low-level identifiers (e.g., VNIC and wildcard values). In so converting the enforcement point identifiers, the translation process 600 ensures that all AppliedTo firewall rules are defined by low-level enforcement point identifiers that can be deciphered by all firewall-enforcing devices that receive the AppliedTo firewall rules.

Figure 7:
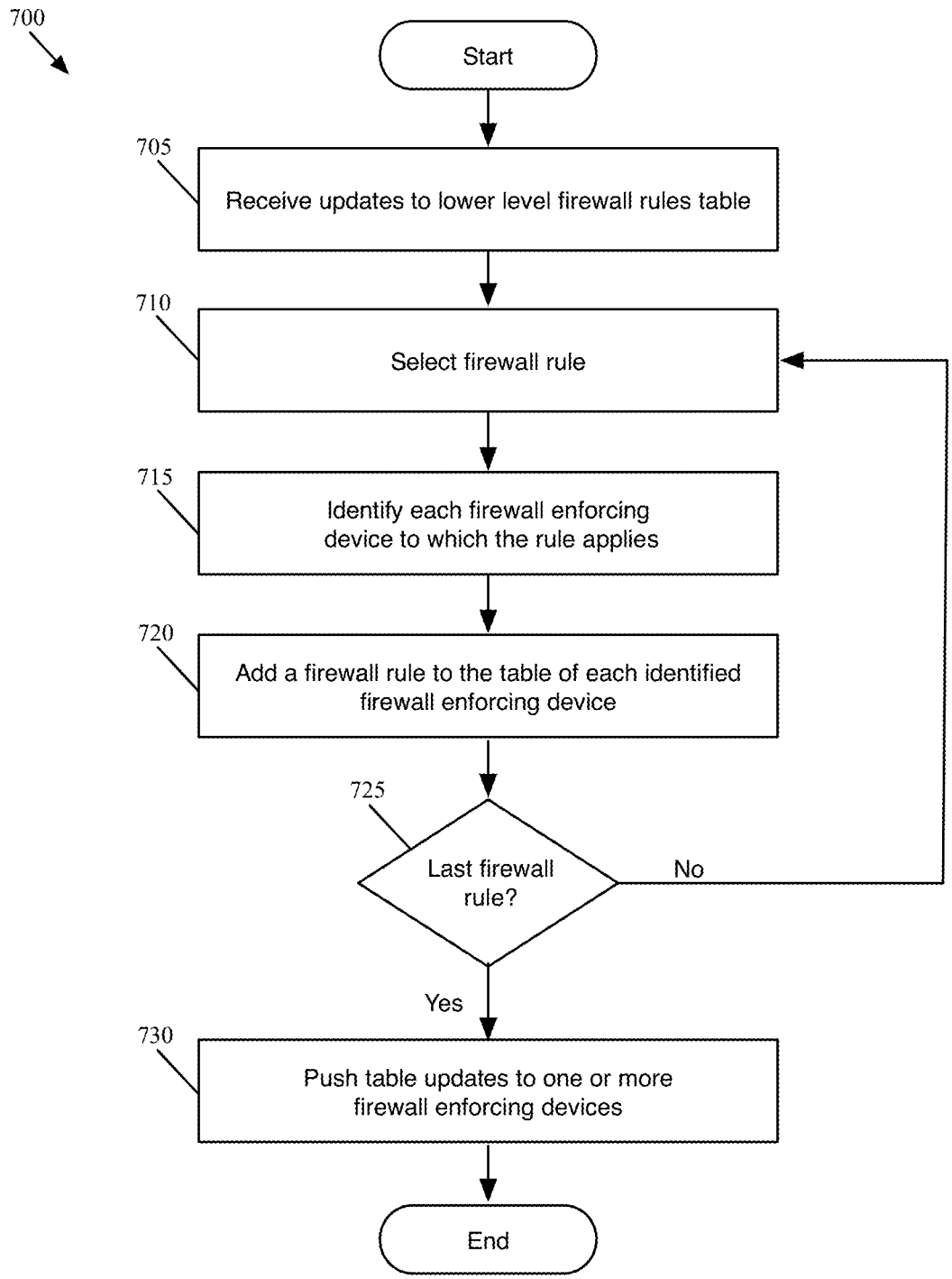

FIG. 7 illustrates a process 700 that the publishing engine 515 of the controller 500 performs in some embodiments. In some embodiments, the process 700 is performed each time a set of AppliedTo firewall rules are stored in the low-level data storage 325. This process 700 collects and distributes host-level AppliedTo rules from the low-level rule data storage 325. In some embodiments, the process 700 is performed as a batch process, while in other embodiments it is performed in real-time upon receiving a notification of the storage of a set of AppliedTo firewall rules in the low-level data storage 325.

As shown in FIG. 7, the process initially receives (at 705) the identity of the set of AppliedTo firewall rules that have been added to the low-level data storage. In some embodiments, the AppliedTo data tuples of these rules are specified in terms of VNIC and wildcard values. The process then selects (at 710) one of the AppliedTo firewall rules in the received set.

Next, at 715, the process identifies each firewall-enforcing device to which the selected rule applies. This rule extraction operation 715 is based on the value(s) specified by the AppliedTo identifier of the selected rule. For instance, in some embodiments, the rule extractor 550 examines each value specified by the AppliedTo identifier of the selected rule to identify the firewall-enforcing device that is related to the examined value (e.g., to identify hypervisor firewall engine or to identify a host that is related to a VNIC value specified by an AppliedTo identifier).

In some embodiments, only one firewall-enforcing device is related to any one non-wildcard AppliedTo value. In other embodiments, however, more than one firewall-enforcing device can be related to an AppliedTo value because multiple firewall-enforcing devices may connect at different times to a data end node specified by the AppliedTo value. Because of this, the publishing engine distributes a firewall rule for the data end node to each firewall-enforcing device that may connect to the data end node. For instance, when a particular host belongs to a compute cluster that implements a particular logical network on which a particular VM is connected, the rule extraction operation 715 of some embodiments identifies a host as being related to the particular VM's VNIC that is specified by an AppliedTo value, even before the VM is instantiated on the particular host. This is because in these embodiments all the hosts in a compute cluster receive the firewall rules for the VMs connected to the logical network so that any host can configure on the fly the firewall rule table for a VM when the VM is instantiated on the host.

Next, for each firewall-enforcing device that the process 700 identified at 715, the process adds (at 720) the firewall rule selected at 710 to a firewall rule data storage that the process maintains for the firewall-enforcing device. These firewall-enforcing device data storages are typically much smaller than the high-level and low-level data storages 320 and 325, because the enforcing-device data storages contain only AppliedTo rules that pertain to their respective enforcing device. When adding some of the AppliedTo firewall rules to the data storages for some of the firewall-enforcing devices, the process 700 removes the AppliedTo identifier from the rule in some embodiments. The circumstances under which some embodiments remove the AppliedTo identifier were described above in the description of the operation of the publishing engine 515.

At 725, the process determines whether it has examined all the AppliedTo firewall rules in the set received at 705. If not, the process returns to 710 to select another AppliedTo firewall rule, and then performs the operations 715-725 for this newly selected AppliedTo firewall rule. When the process determines that it has examined all the AppliedTo firewall rules in the received set, the process 700 (at 730) pushes (through a network) to each firewall-enforcing device the firewall rules that it stored (at 720) in the data storage of the firewall-enforcing device. After 730, the process ends.

While the rule extraction and distribution process 700 was described above by reference to numerous details, one of ordinary skill in the art will realize that this process can be implemented differently in other embodiments. For instance, instead of pushing the firewall rules to the enforcing devices, the firewall-enforcing devices pull the firewall rules from the publishing engine in other embodiments.

Also, as mentioned above, the process 700 in some embodiments examines each AppliedTo value of each firewall rule to identify the enforcing device data storage that should store the firewall rule. Instead of examining each value specified by the AppliedTo identifier of a low-level firewall rule, the rule extraction operation 715 in some embodiments associates some or all of the firewall rules to the firewall-enforcing devices by associating the high-level or low-level AppliedTo identifiers of the firewall rules in the high-level data storage 320 with one or more firewall-enforcing devices. While using the AppliedTo identifiers (e.g., high or low level identifiers) in the high-level data storage 320 to associate the firewall rules with the firewall-enforcing devices, some embodiments push to the firewall-enforcing devices (1) the low-level AppliedTo identifiers that are stored in the high-level data storage 320, and (2) the low-level AppliedTo identifiers (e.g., from the group-definition storage 540) that correspond to the high-level AppliedTo identifiers that are identified in the high-level data storage 320.

Also, instead of defining and maintaining data storages for all firewall-enforcing devices individually, the rule extraction operation 715 aggregates the firewall rules for at least one group of related firewall-enforcing devices in one data storage in some embodiments. For instance, in some embodiments, all hosts of one compute cluster in a datacenter receive the same set of firewall rules because each host in the compute cluster needs to be prepared to implement each logical switch that is implemented by any one host in the compute cluster. Accordingly, for all hosts in one compute cluster, the process 700 in some embodiments creates just one compute-cluster data storage 555 that contains all the firewall rules for all the hosts in that cluster.

Figure 8:
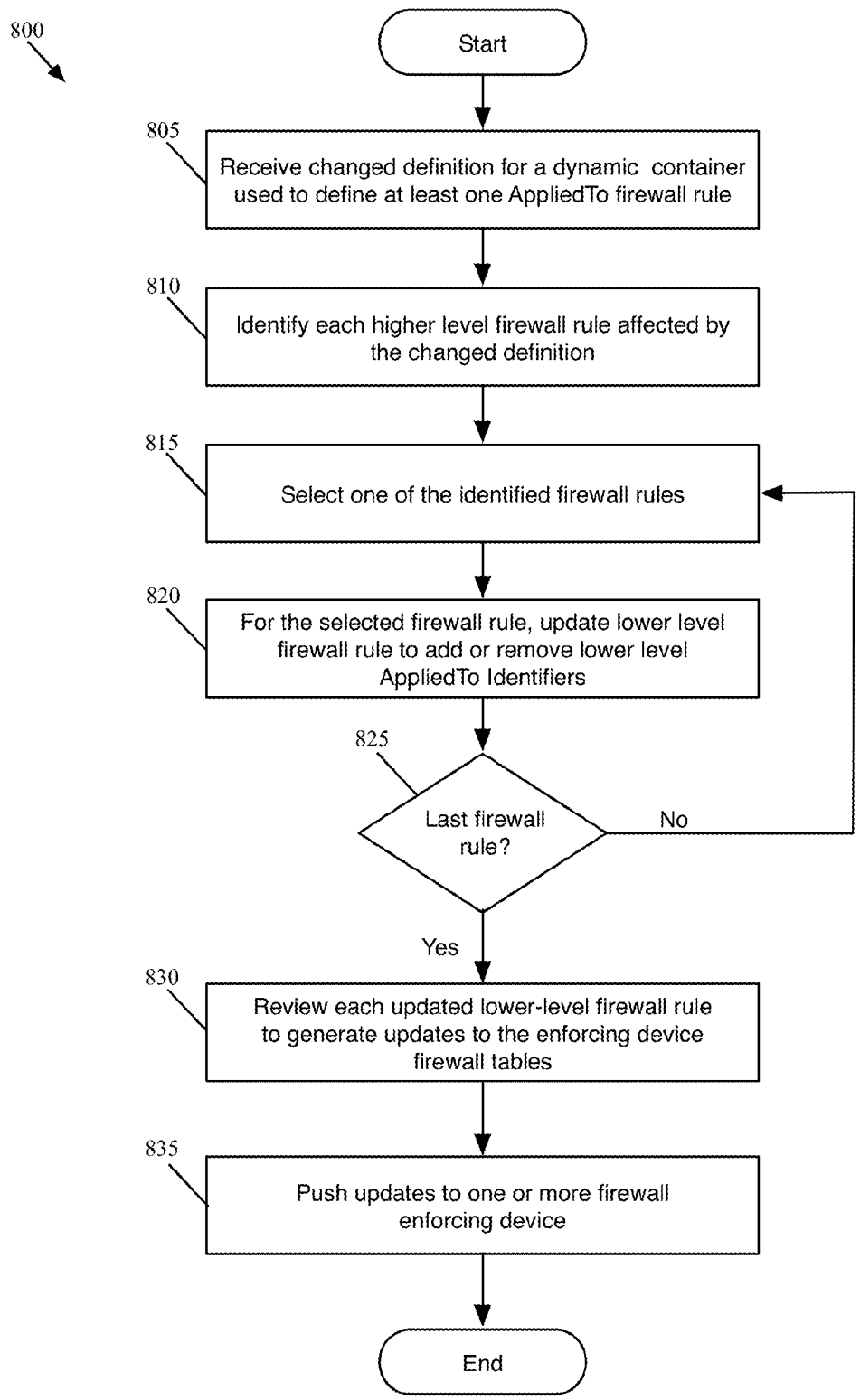

FIG. 8 illustrate a process 800 that the controller 500 performs in some embodiments to update the AppliedTo values of firewall rules when the membership of a dynamic construct that is used to define an AppliedTo identifier is modified. The process 800 sends updated membership change for the affected firewall rule(s) to any firewall-enforcing devices that need to be informed of this membership change. The process 800 also sends an affected firewall rule to a new firewall-enforcing device, or removes the affected firewall rule from a firewall-enforcing device, when the membership change to a dynamic container requires the addition or removal of a firewall-enforcing device.

The process 800 will be explained by reference to an example illustrated in FIG. 9. This example illustrates the creation of AppliedTo firewall rules in the high- and low-level data storages 320 and 325 based on a dynamic security group SGZ, and the modification of the AppliedTo firewall rule in the low-level data storage 325 after a modification to the membership of the security group SGZ.

As shown in FIG. 8, the process 800 starts when it is notified (at 805) of the modification to the definition of a dynamic construct (e.g., a network construct, a compute construct, or a security group) that is used to define the AppliedTo identifier of one or more AppliedTo rules in the high-level data storage 320. As mentioned above, the group-definition data storage stores the definition of the dynamic constructs in some embodiments. In some of these embodiments, a user (through the UI module 530) or the automated provisioning module 535 can modify the definition of a dynamic construct at 805. Also, in some embodiments, the group-definition storage 540 provides (at 805) a callback to the translation engine, in order to notify this engine of a modification to a definition of a dynamic construct.

At 810, the process identifies each high-level firewall rule that is affected by the changed definition of the dynamic construct. This is because one dynamic construct can be used in multiple AppliedTo identifiers of multiple AppliedTo firewall rules in the high-level data storage 320. The process 800 then selects (at 815) one of the high-level firewall rules identified at 810. For the selected high-level firewall rule, the process 800 then updates (at 820) its corresponding lower-level firewall rule in the lower-level data storage 325 to reflect the change to the definition of the dynamic construct. This update may result in the addition or removal of one or more low-level AppliedTo identifiers from the corresponding lower-level firewall rule.

Figure 9:
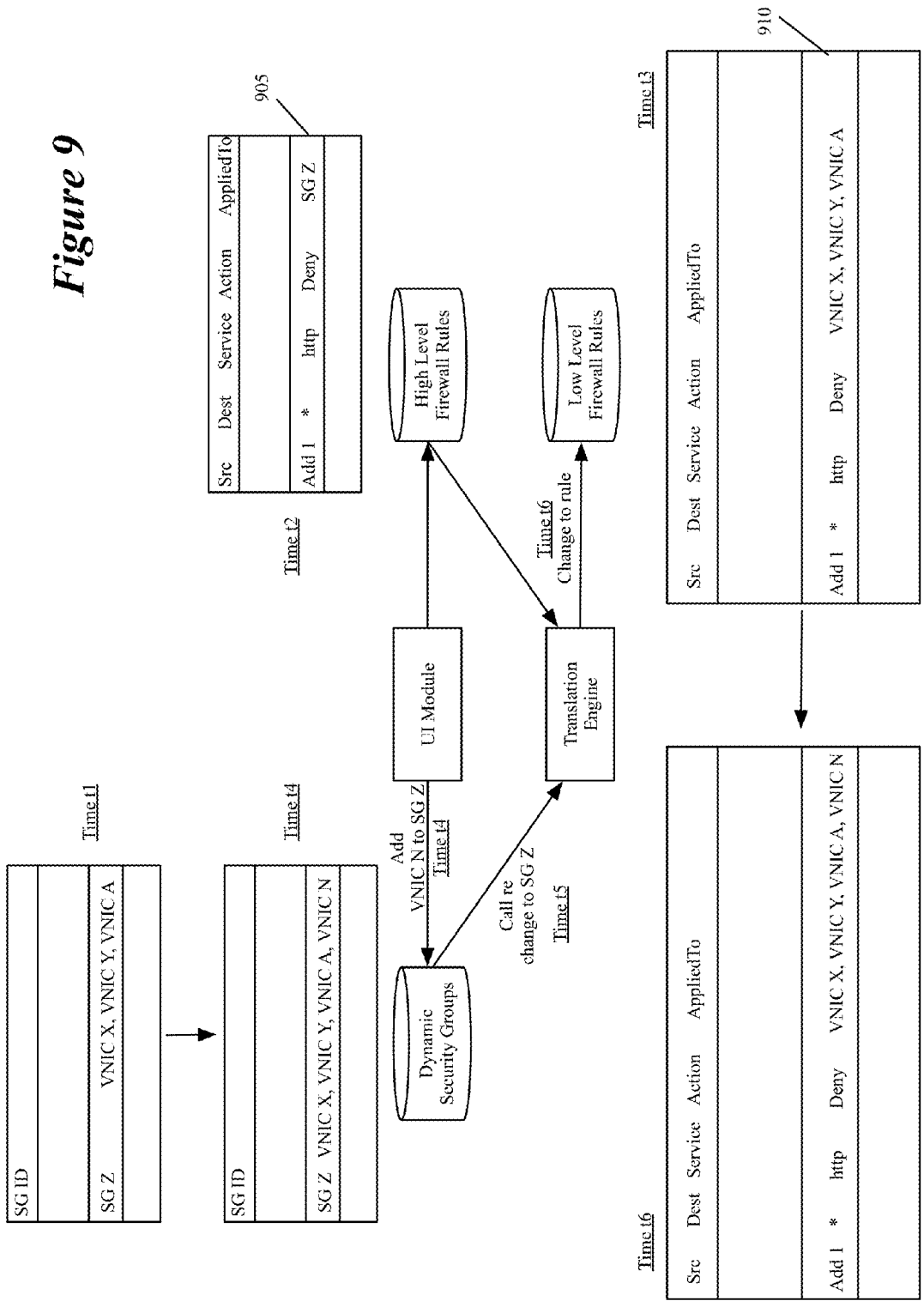

FIG. 9 illustrates an example that reflects the addition of a VNIC (called VNIC N) to a low-level firewall rule after this VNIC has been added to the definition of the security group SGZ. As shown in this figure, before VNIC N is added to the definition of the security group SGZ, the security group is defined (at time t1), a high-level rule 905 is created by reference to this group SGZ in the high-level data storage 320 (at time t2), and a low-level rule 910 is created for the high-level rule 905 in the low-level data storage 325 (at time t3). Once the security group SGZ is modified (at time t4) to include the VNIC N, the translation engine is notified (at time t5) of this change. The translation engine then identifies high-level rule 905 as a rule that refers to the modified security group SGZ. This engine next modifies the low-level rule 910 (at time t6) to include VNIC N in the AppliedTo identifier of this rule.

After 820, the process determines (at 825) whether it has examined all high-level firewall rules that it identified at 810 (i.e., all the high-level rules that refer to the modified dynamic construct). If not, the process returns to 815 to select another identified high-level firewall rule and to update (at 820) the low-level firewall rule corresponding to the high-level firewall rule. Otherwise, the process transitions to 830.

At 830, the process 800 reviews each lower-level rule that it has updated at 820, in order to update the enforcing-device data storages (e.g., data storages 555, 560 and 565) that contain the firewall rules for the firewall-enforcing devices. To perform this update, the process in some embodiments identifies the newly added or removed AppliedTo value(s) of each affected low-level firewall rule, and adds or removes this value from each enforcing-device firewall rule (in an enforcing-device data storage) that needs to be so updated. For instance, in the example illustrated in FIG. 9, the addition of the VNIC N to the lower-level firewall rule 910 might require the addition of this VNIC to a host-level or a compute-cluster level data storage that stores the firewall rules for an affected host or compute cluster. An affected host is a host that executes or may execute a VM with the VNIC N, while an affected compute cluster is a compute cluster that includes such a host.

In this manner, the process (at 830) pushes to one or more enforcing-device data storages the updated membership change to the lower-level firewall rule(s) that is caused by the change in the dynamic construct. In some cases, the change in the dynamic construct and resulting change in one or more low-level firewall rules require a firewall rule to be added to or removed from one or more enforcing-device data storages. Accordingly, in some cases, the process 800 sends an affected firewall rule to a new firewall-enforcing device, or removes the affected firewall rule from a firewall-enforcing device, when the membership change to a dynamic container requires the addition or removal of a firewall-enforcing device.

After updating the enforcing-device data storage(s) at 830, the process 800 pushes (at 835) updates to each firewall-enforcing device (through a network) which had a data storage updated at 830 by the process 800. When the process updates (at 830) the AppliedTo membership of a firewall rule in an enforcing device's data storage, the process sends (at 835) the membership change to the enforcing device. On the other hand, when the process adds (at 830) a new firewall rule to an enforcing device's data storage, the process sends (at 835) the firewall rule to the enforcing device. Based on the received modification, the firewall-enforcing device modifies the membership of its firewall rule, or adds or removes a firewall rule. After 835, the process ends.

One of ordinary skill in the art will realize that the update process 800 is implemented differently in other embodiments of the invention. For instance, the controller 500 in some embodiments does not maintain lower-level rules in the lower-level data storage 325. In these embodiments, the update process uses the updated group definitions in the group-definition storage 540 to update directly the firewall rules that it stores in the enforcing device data storages, when the membership of a dynamic construct is modified in the group-definition store.

II. Host Architecture and Operation

Figure 10:
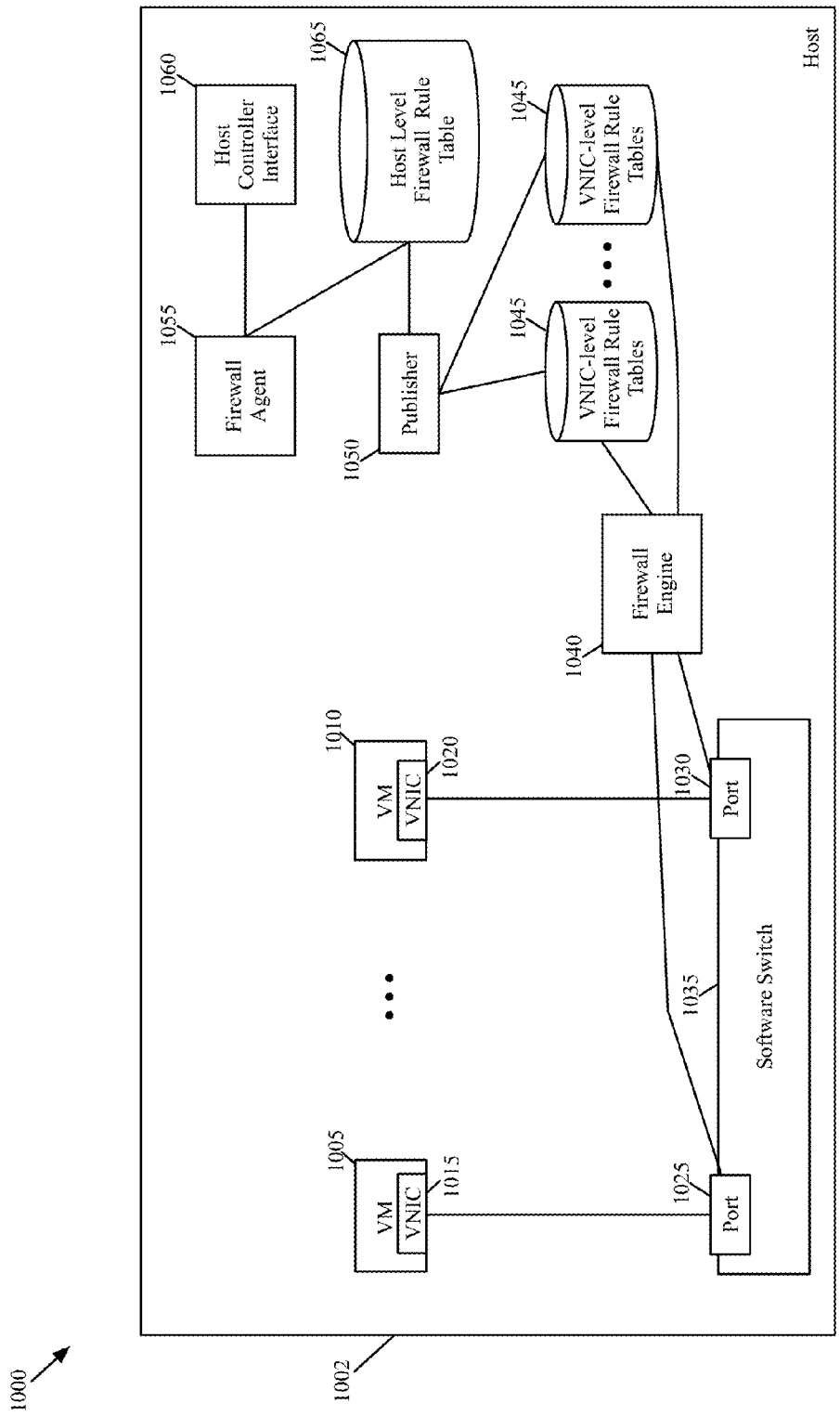
FIG. 10 illustrate the firewall enforcement architecture of a multi-VM host of some embodiments of the invention.

FIG. 10 illustrate the firewall enforcement architecture 1000 of a multi-VM host 1002 of some embodiments of the invention. This host receives AppliedTo firewall rules and based on these rules, specifies multiple VNIC-level firewall rule data storages, which it then uses to perform VNIC-level firewall operations on packets sent by, and received for, each VM.

As shown in FIG. 10, the virtualization architecture 1000 includes (1) multiple VMs 1005 and 1010, (2) a VNIC 1015 or 1020 for each VM, (3) a software switch 1035, (4) a port 1025 or 1030 for each VNIC, (5) a firewall engine 1040, (6) VNIC-level firewall rules 1045, (7) a firewall rule publisher 1050, (8) a firewall agent 1055, (9) a host-level firewall rule table 1065, and (1) a host-controller interface 1060.

In some embodiments, the VMs execute on top of a hypervisor (not shown) that is executing on the host. FIG. 10 illustrates just two VMs 1005 and 1010, but a larger number of VMs execute on the host 1002 in some cases. Each VM may belong to one tenant or to multiple tenants when the host operates in a multi-tenant environment.

Each VM includes a VNIC in some embodiments. For instance, VM 1005 includes VNIC 1015 while VM 1010 includes VNIC 1020. Each VNIC of the VM is responsible for exchanging packets between the VM and the software switch. As further described below, each VNIC connects to a particular port of the software switch, which connects to a physical NIC (not shown) of the host. In some embodiments, the VNICs are software abstractions of a physical NIC that are implemented by the virtualization software.

In some embodiments, the software switch maintains a single port for each VNIC of each VM. For instance, for VNICs 1015 and 1020, the software switch 1035 includes ports 1025 and 1030. The software switch 1035 performs packet-processing operations to forward packets that it receives on one of its ports to another one of its ports. For example, in some embodiments, the software switch tries to use data in the packet (e.g., data in the packet header) to match a packet to flow based rules, and upon finding a match, to perform the action specified by the matching rule. The software switch 1035 connects to a physical NIC (through a NIC driver (not shown)) to send outgoing packets and to receive incoming packets. In some embodiments, the software switch 1035 is defined to include a port (not shown) that connects to the physical NIC's driver to send and receive packets to and from the NIC.

Also, in some embodiments, the software switch of one host can form multiple logical switches with software switches of other hosts, with each logical switch serving a conceptual switch that services a logical network. In other words, different logical switches can be defined to specify different logical networks for different users, and each logical switch can be defined by multiple software switches on multiple hosts. VXLAN provides one manner for creating such logical switches. The VXLAN standard is described in Mahalingam, Mallik; Dutt, Dinesh G.; et al. (2013-05-08), VXLAN: A Framework for Overlaying Virtualized Layer 2 Networks over Layer 3 Networks, IETF.

In some embodiments, the ports of the software switch 1035 include one or more function calls to one or more modules that implement special input/output operations on incoming and outgoing packets that are received at the ports. One of these function calls is to the firewall engine 1040, which performs in some embodiments firewall operations on incoming and/or outgoing packets (i.e., on packets that are received by the host for one of the VMs or on packets that are sent by one of the VMs). Other examples of such I/O operations include ARP broadcast suppression operations and DHCP broadcast suppression operations, as described in U.S. patent application Ser. No. 14/070,360. Other I/O operations can be so implemented in some embodiments of the invention. By implementing a stack of such function calls, the ports can implement a chain of I/O operations on incoming and/or outgoing packets in some embodiments. Also, in some embodiments, other modules in the data path (such as the VNICs, etc.) implement the I/O function call operations (such as the firewall function calls).

As mentioned above, the firewall engine 1040 can be called (e.g., by a port 1025 or 1030 of the software switch 1035) for incoming or outgoing packets to check whether such packets should be delivered to a VM or sent from a VM based on VNIC-level firewall rules that are stored for the VM's VNIC in the VNIC-level firewall data storage 1045. In some embodiments, the firewall engine 1040 can be called by the port that connects to the physical NIC's driver (e.g., for incoming packets).

The firewall engine tries to match the received packets' identifiers (e.g., five-tuple identifiers extracted from the packet header) with the associated identifiers (e.g., five-tuple identifiers) of the firewall rules stored in the VNIC data storage 1045 of the VNIC that is the destination of an incoming packet or the source of an outgoing packet. In other words, to match a rule with a packet, the firewall engine identifies n-data tuples for a packet (e.g., extracts these tuples from the packet's header) and compares the identified tuples with the n-data tuples of each rule.

The firewall rule publisher 1050 populates and updates the VNIC-level firewall rule data storages 1045 based on the host-level AppliedTo firewall rules that are stored in the host-level firewall rule data storage 1065. In some embodiments, the publisher examines the AppliedTo identifier of each new firewall rule or updated firewall rule in the host-level firewall data storage 1065 to determine whether the rule pertains to a VNIC of one of the VMs currently instantiated on the host. Whenever the publisher 1050 identifies a new or updated rule that pertains to one such VNIC, the publisher pushes the new rule or updated rule to the VNIC's firewall rule table 1045. In pushing this rule to the VNIC's firewall rule table, the publishing engine removes the AppliedTo identifier from the firewall rule before storing the firewall rule in the VNIC's firewall rule table.

The firewall agent 1055 populates and updates the host-level firewall rule data storage 1065 based on host-level AppliedTo firewall rules that it receives from the controller through the host-controller interface 1060 and the network (not shown). As mentioned above, the controller in some embodiments pushes to each host the AppliedTo firewall rules for not only the VMs that the host is currently executing but also for the VMs that the host may execute at some later point in time. Also, as mentioned above, a host may operate as part of a compute cluster, and all hosts of the compute cluster in some embodiments are configured to support a set of tenants or logical networks, so that when a VM for one of the tenants or logical networks is instantiated on or moved to one such host, some or all of the data needed for configuring that VM on the host already exists on the host. In some such embodiments, each host in the compute cluster receives the same set of AppliedTo firewall rules, so that each host can configure on its own (without going to the controller) the VNIC firewall rule table for any possible VM that may be instantiated on or moved to the host.

In some embodiments, the software switch 1035, the firewall engine 1040, and the VNIC-level firewall rule tables 1045 operate in the kernel space, while the publisher 1050, the firewall agent 1055, the host-level firewall rule table 1065, the host-controller interface 1060 and the VMs 1005 and 1010 operate in the user space. By operating in the kernel space, the firewall engine 1040 operates faster than it would otherwise do in the user space.

Figure 11:
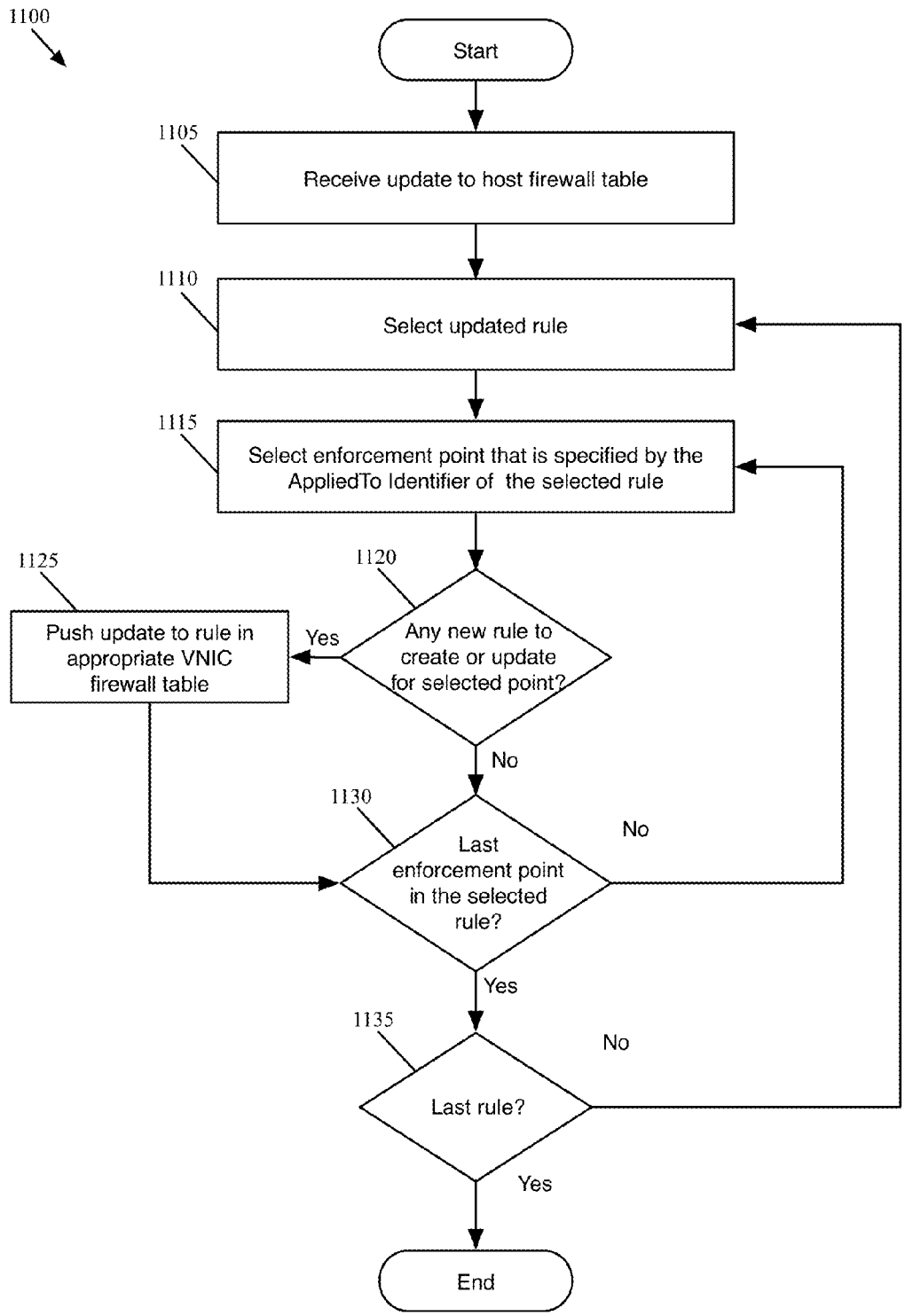
FIGS. 11-13 illustrate processes for several operations of the firewall enforcing modules of the host of FIG. 10 in some embodiments.

The operation of the host 1002 in some embodiments will now be described by reference to FIGS. 11-13. FIG. 11 illustrates a process 1100 that the publisher 1050 performs in some embodiments to maintain the VNIC-level firewall tables 1045. The publisher performs this process each time that the host-level firewall rule table 1065 receives additions and/or modifications to a set of rules from a controller. In other words, the process 1100 is performed each time the firewall agent 1055 stores a new set of rules in the rule table 1065, removes a set of rules from the rule table 1065, and/or modifies a previous set of rules in the rule table 1065.

As shown in FIG. 11, the process 1100 initially receives (at 1105) a notification of an update to the host firewall table 1065. This update may add one or more rules to the table 1065, remove one or more rules from the table 1065, or modify one or more rules in the table 1065. The collection of all rules affected by this update is referred to below as the received set of updated rules. The notification in some embodiments is in the form of a callback from the data storage 1065. In other embodiments, the notification is provided by the firewall agent 1055. In still other embodiments, the publisher periodically checks the data storage 1065.

Next, at 1110, the process 1100 selects one of the rules in the set of updated rules. The process then selects (at 1115) an enforcement point that is associated with the selected rule. When the selected rule is a newly received rule, the selected enforcement point can be any one of the enforcement points identified by the AppliedTo identifier of the rule selected at 1110. When the selected rule is a rule that has been removed from the host firewall rule table 1065, the selected enforcement point can be any enforcement point that is identified by the AppliedTo identifier of the rule that is being removed. When the selected rule is a rule that was previously stored and that has its set of enforcement points modified, the enforcement point selected at 1115 is one of the enforcement points that has been added or removed by the update to the selected rule.

After 1115, the process determines (at 1120) whether any VNIC-level rule has to be added to, removed from, or updated in a VNIC-level firewall table 1045. In other words, at 1120, the process determines whether the selected enforcement point (i.e., the enforcement point selected at 1115) corresponds to a VNIC of a VM that is executing on the host. If not, the process transitions to 1130, which will be described below. Otherwise, the process pushes (at 1125) an update to the firewall rule data storage 1045 of the VNIC that corresponds to the selected enforcement point. This update adds a firewall rule to the VNIC's data storage 1045 when the selected rule is a new rule or is an updated rule that now also includes the VNIC as an enforcement point. This update removes a previous firewall rule from the VNIC's data storage 1045 when the selected rule is a rule that is being removed or is an updated rule that no longer includes the VNIC as an enforcement point. In adding a firewall rule to the VNIC's data storage 1045, the process 1100 removes (at 1025) the AppliedTo tuple from the firewall rule before adding this firewall rule to the data storage 1045.

From 1125, the process transitions to 1130. At 1130, the process determines whether it has examined all of the enforcement points that it has to examine for the rule selected at 1110. When the selected rule is a new rule to add or is a previous rule to remove, the process has to examine all the enforcement points that are specified in the AppliedTo identifier of the rule. On the other hand, when the selected rule is an update to a previous rule, the process has to examine all of the new enforcement points that are added to the rule and all of the previous enforcement points that are removed from the rule.

When the process determines (at 1130) that it has not examined all of the necessary enforcement points for the selected rule, it returns to 1115 to select another enforcement point of the selected rule that it has to examine. The process then repeats the subsequent operations to determine whether it has to make any VNIC-level rule changes and if so, to make the VNIC level rule change.

When the process determines (at 1130) that it has examined all of the necessary enforcement points for the selected rule, it determines (at 1135) whether it has examined all of the rules specified by the set of updated rules. If not, it returns to 1110 to select another one of the rules that is specified by the set of updated rules, and then repeats its operations 1115-1130 for this selected rule. When the process determines (at 1135) that it has examined all of the rules specified by the set of updated rules, it ends.

Figure 12:
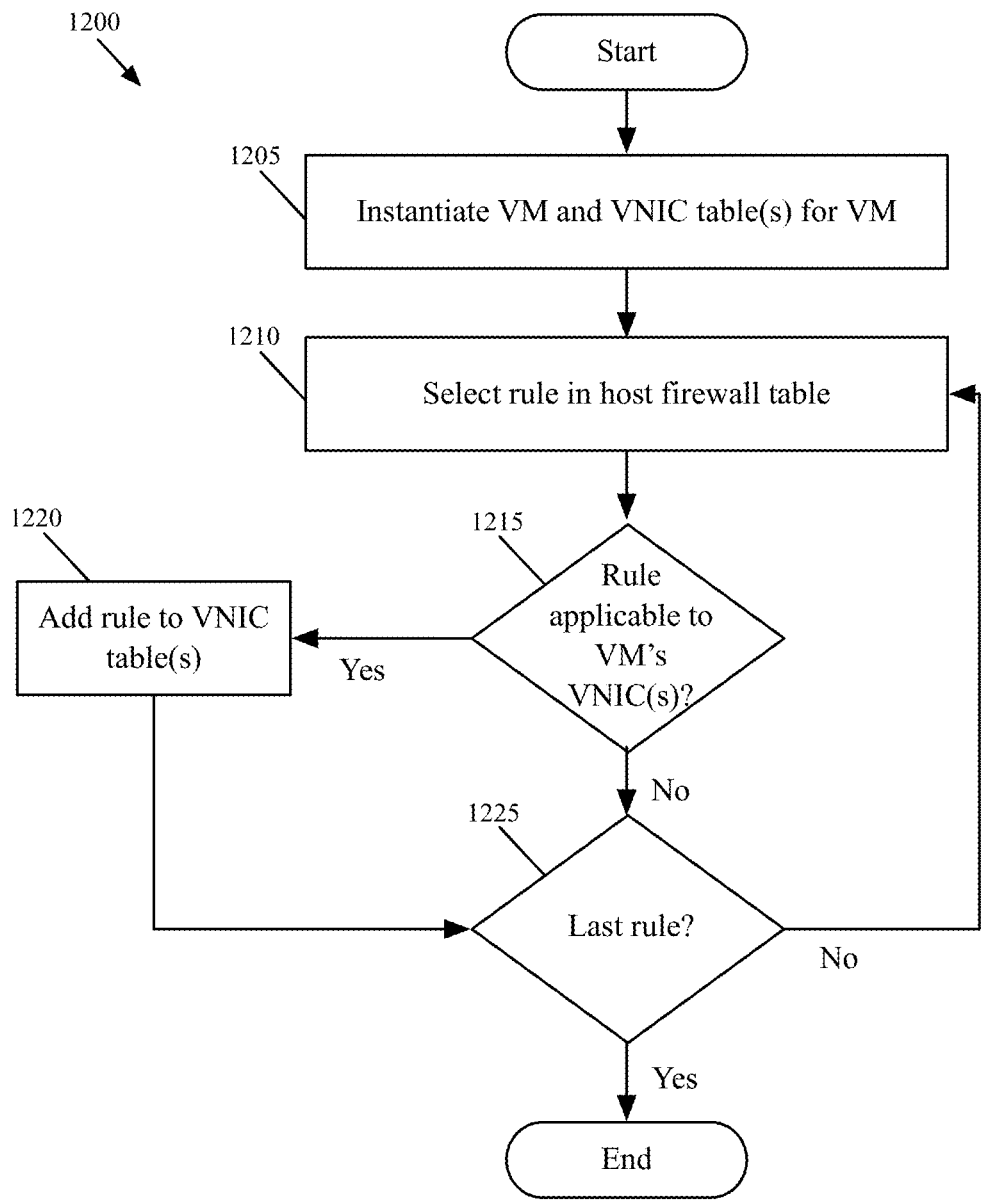

FIG. 12 illustrates a headless process 1200 that the host performs in some embodiments to configure a VNIC-level firewall table when a VM is instantiated on the host. This process is referred to as a headless process as it configures the VNIC-level firewall table without referring to a controller during the configuration of the table. The process is performed as part of the instantiation of the VM, or after the process for instantiating the VM, on the host. As shown, the process initially (at 1205) instantiates the VM and specifies a VNIC-level table for the VM's VNIC. Next, the process selects (at 1210) a firewall rule in the host-firewall rule table 1065.

The process determines (at 1215) whether the selected rule is applicable to the instantiated VM's VNIC. In other words, the process determines whether the AppliedTo identifier of the selected rule identifies the VNIC as one of the enforcement points of the selected firewall rule. When the selected firewall rule is not applicable to the instantiated VM's VNIC (i.e., when the rule's AppliedTo identifier does not identify this VNIC), the process transitions to 1225, which will be explained below.

When the selected firewall rule's AppliedTo identifier identifies the instantiated VM's VNIC, the process adds (at 1220) the selected firewall rule to the VNIC's firewall data storage 1045. In adding this selected firewall rule to the VNIC-level firewall data storage 1045, the process 1200 removes the AppliedTo tuple from the firewall rule. From 1220, the process transitions to 1225.

At 1225, the process determines whether it has examined all the AppliedTo rules in the host-level firewall rule data storage 1065. If not, it returns to 1210 to select another rule, and then repeats its subsequent operations for this selected rule. When the process determines (at 1225) that it has examined all of the AppliedTo rules, it ends.

Figure 13:
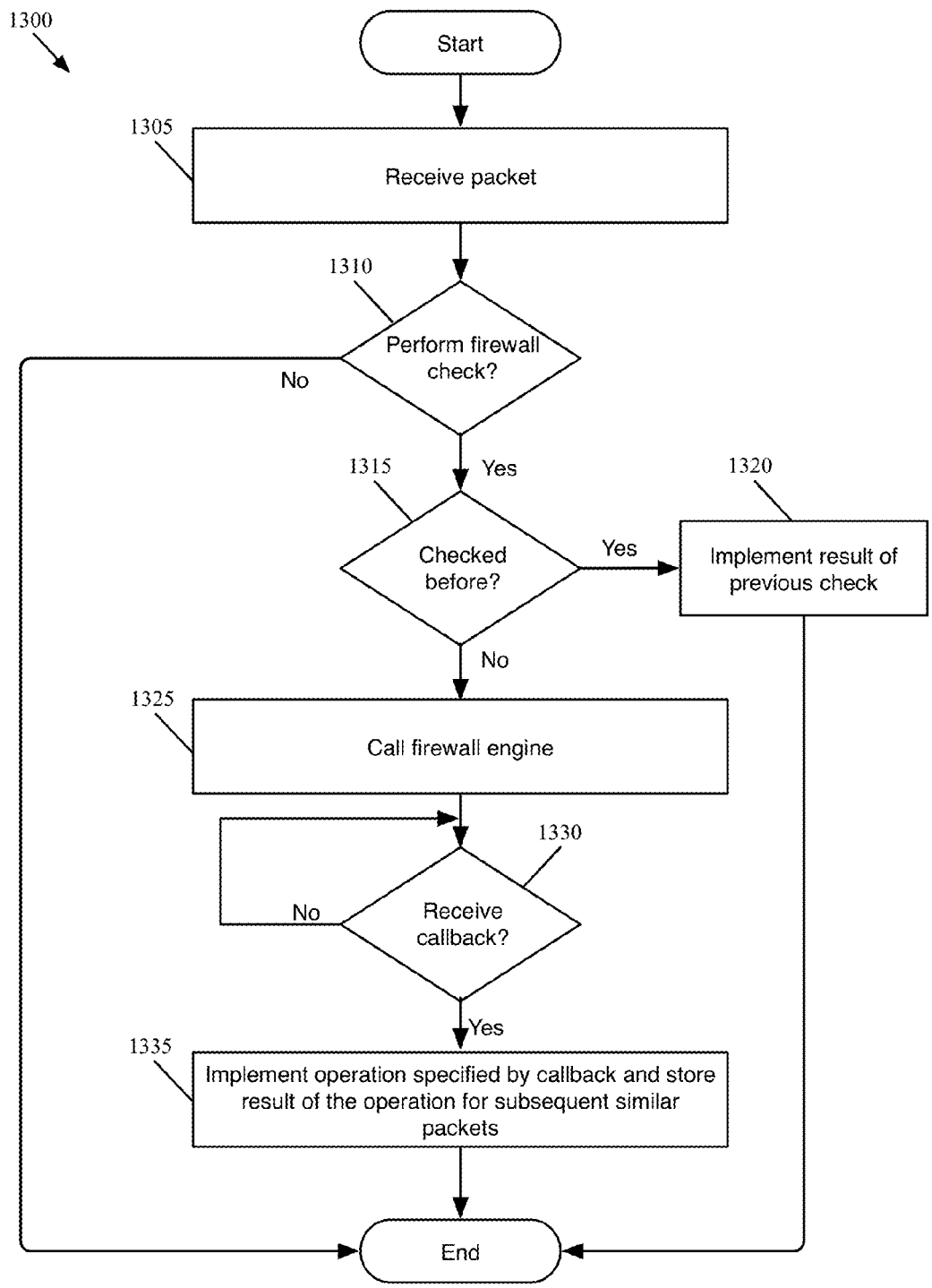

FIG. 13 illustrates a process 1300 that a port of the software switch 1035 performs in some embodiments to enforce firewall rules on a packet that it receives. In some embodiments, the port performs this operation for both incoming and outgoing packets. In other embodiments, the port performs this operation for either only the incoming packets or only the outgoing packets. In still other embodiments, one port (e.g., the port that connects to a VM's VNIC) of the switch performs this operation for outgoing packets, while another port (e.g., the port that connects the software switch to the physical NIC, e.g., through the NICs driver) performs this operation for incoming packets. By checking both incoming and outgoing packets, the process 1300 can enforce AppliedTo firewall rules at both source and destination of packets.

As shown in FIG. 13, the process initially receives (at 1305) a packet. It then determines (at 1310) whether it should perform firewall check for the received packet. In some embodiments, the process makes this determination by determining whether the firewall feature has been enabled for the VNIC that is the source of an outgoing packet or the destination of an incoming packet. If the firewall feature has not been enabled, the process ends.

Otherwise, the process determines (at 1315) whether it previously checked the firewall rules for a packet with identical firewall attribute tuples as the received packet. The firewall engine identifies a firewall rule for a packet based on n-tuples that are retrieved from the packet's header (e.g., the packet's five tuples: source, source port, destination, destination port, and service). Two packets have identical firewall attributes when their n-tuples match. As mentioned below, the process 1300 in some embodiments stores the action that it performs on a particular packet after identifying the firewall rule for the packet, so that it can subsequently perform this action again on packets that are identical to the particular packet.

When the process determines (at 1315) that it has previously checked the firewall rules for an identical packet, it transitions to 1320 to perform the operation (e.g., drop or allow) that was the result of the previous check, and then ends. It should be noted that other embodiments, however, do not store the action that is performed. In these embodiments, the process would not perform the check at 1315 and would transition from 1310 to 1325 when it determines (at 1310) that it has to perform a firewall check on a packet. Alternatively, other embodiments that store the actions that are specified by prior firewall rule checks of the firewall engine 1040, have the firewall engine store these actions in a connection state data storage that the firewall engine maintains for all of the VMs (e.g., stores the prior actions for each port in a connection state table for that port). In these embodiments, the check 1315 for the prior firewall rule and the subsequent operation 1320 based on the prior check, are performed by the firewall engine 1040. In these embodiments, the process 1300 would transition from 1310 to 1325 when it determines (at 1310) that it has to perform a firewall check on a packet, and the firewall rule engine 1040 would perform the check 1315.

When the process 1300 determines (at 1315) that it has not previously checked the firewall rules for an identical packet, it passes the n-tuples of the received packet (i.e., the packet received at 1305) to the firewall engine. With the n-tuples, the firewall engine checks the VNIC-level firewall table 1045 of the VNIC that is the source of an outgoing packet or the destination of an incoming packet to determine what action needs to be done on the received packet. In some embodiments, the VNIC-level firewall table has a catchall rule that ensures that each packet matches at least one rule (i.e., the catchall rule) when it does not match any other rule in the firewall table. Also, in some embodiments, the rules in the firewall rule table are arranged in a hierarchical way, and the rule check is performed according to the hierarchy, to ensure that a packet matches a higher priority rule before matching a lower priority rule when the packet can match more than one rule.

After 1325, the process transitions to 1330, where it waits until it receives a callback from the firewall engine. In some embodiments, the firewall engine's callback either specifies that the packet should be allowed to pass through or it should be dropped. When the process receives the engine's callback, the process transitions to 1335 to perform the action according to the engine's callback. In other words, the process in some embodiments drops the packet when the callback specifies that the packet should be dropped. On the other hand, the process allows the packet to pass through when the callback specifies that the packet should be allowed. It should be noted that in some embodiments the port might not allow a packet to pass through even when the callback specifies that the packet should be allowed to pass through, because some other function might direct the port to drop the packet.

At 1335, the process also stores the operation that the firewall engine specified so that this operation can be used subsequently at 1320, when the port receives a packet that is identical to the received packet. After 1335, the process ends.

III. Network Control System

Figure 14:
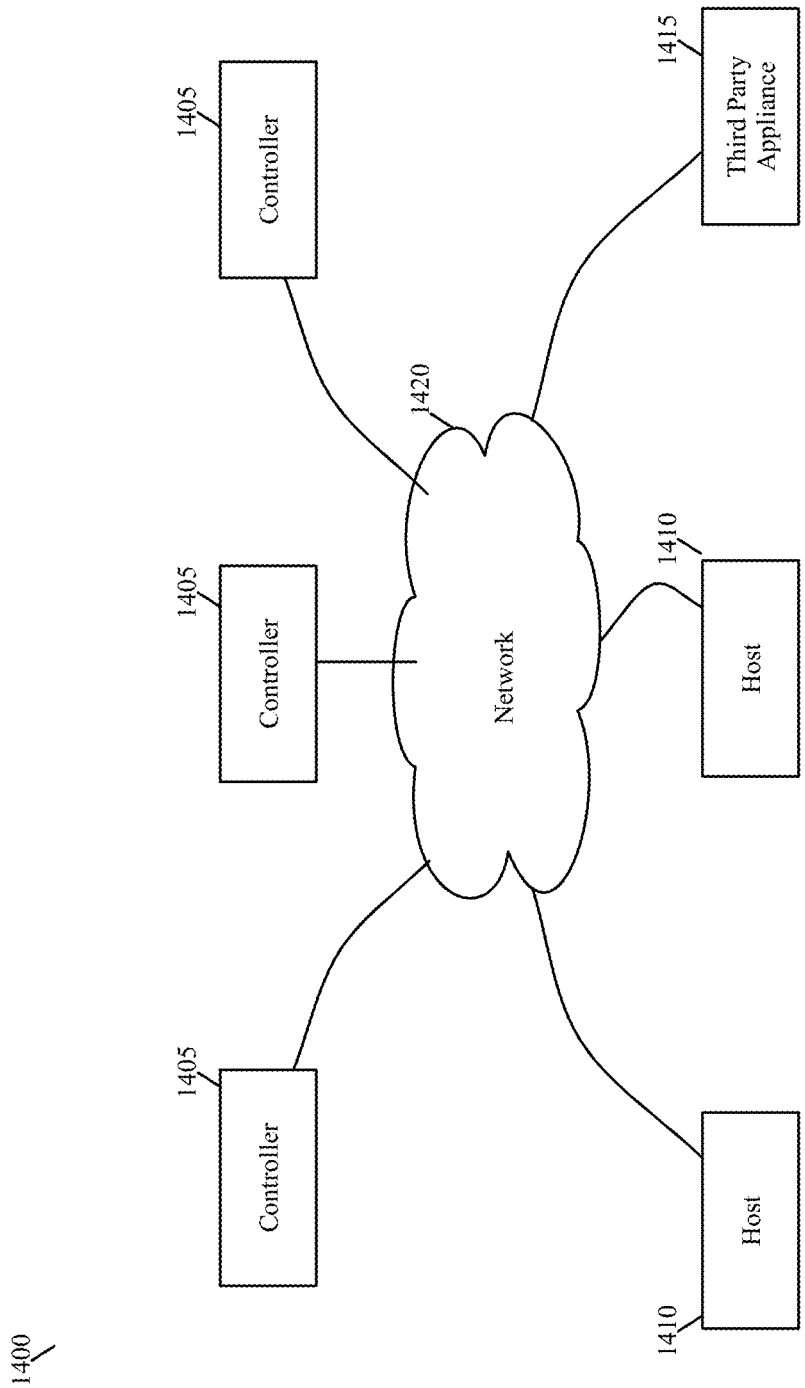
FIGS. 14 and 15 illustrate network control systems of some embodiments of the invention.

FIG. 14 illustrates a network control system 1400 of some embodiments of the invention. As shown, the network control system 1400 includes multiple controllers 1405, multiple hosts 1410, and multiple unmanaged third-party appliances 1415, and a network 1420. Through the network, the controllers, hosts and third party appliances are communicatively coupled. In some embodiments, the network control system is implemented in a datacenter and the network 1420 is the network fabric (e.g., switches, routers, wiring, etc.) that connects the various components.

In some embodiments, each host 1410 has one or more VMs executing on it. The host in some embodiments is similar to host 1002 of FIG. 10, and hence has the firewall enforcement architecture 1000. The third party appliances are unmanaged appliances, such as third party firewall device.

In some embodiments, each controller 1400 is similar to the controller 500 of FIG. 5. Each controller is responsible for configuring and distributing AppliedTo firewall rules and non-AppliedTo firewall rules to the hosts and third-party appliances. Some embodiments use multiple controllers in order to distribute the firewall rule configuration and distribution workload. For instance, in some embodiments, a first controller is responsible for a first set of firewall rules for a first set of logical networks, a second controller is responsible for a second set of firewall rules for a second set of logical networks, a third controller is responsible for a third set of firewall rules for a third set of logical networks, and so on. Other embodiments, however, use only one controller to configure and distribute the firewall rules to all of the hosts and third-party appliances.

Figure 15:
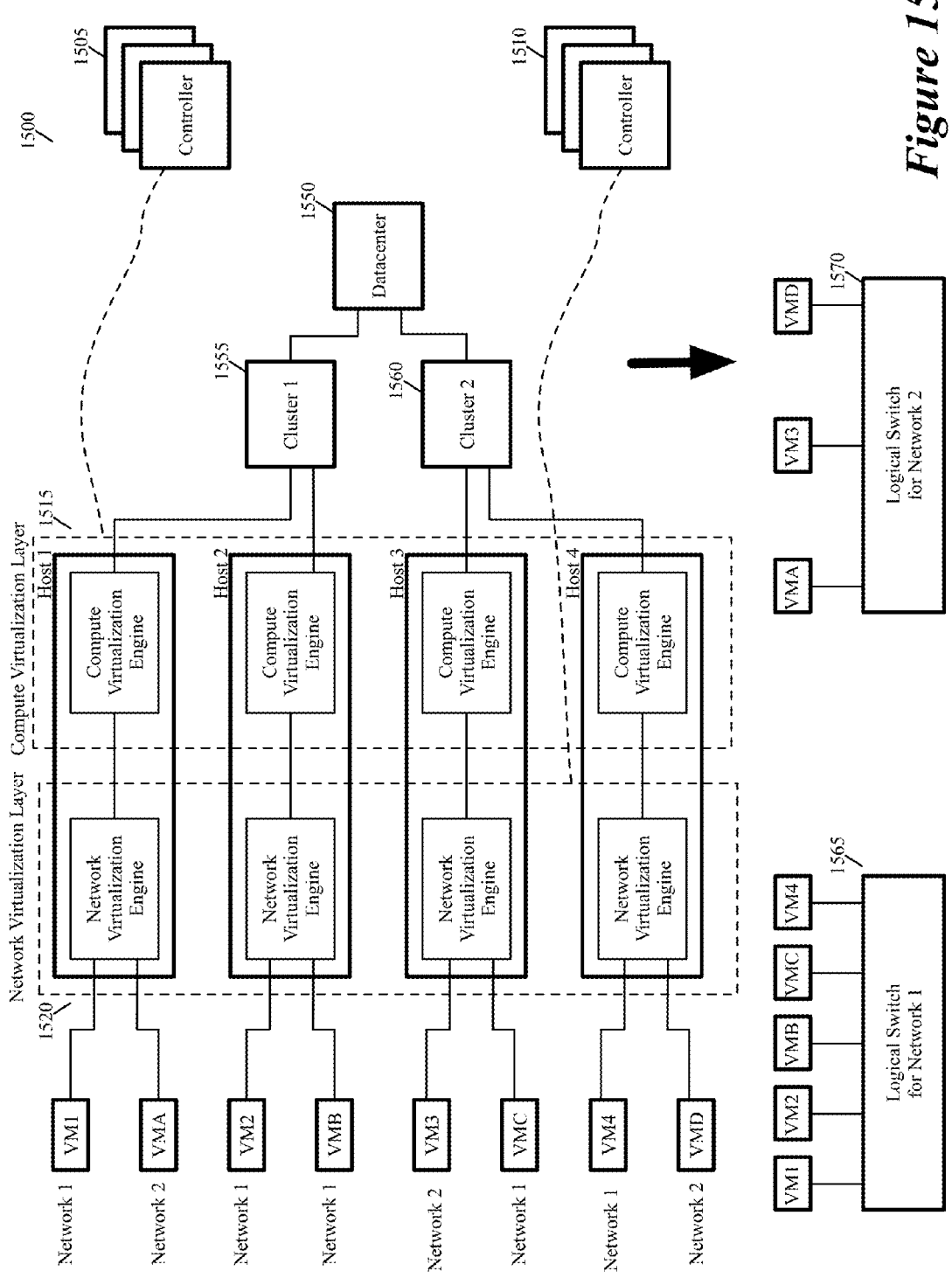

FIG. 15 illustrates another view of a network control system 1500 of some embodiments. As shown in this figure, the network control system 1500 uses first and second sets of controllers 1505 and 1510 to control respectively a compute virtualization layer 1515 and a network virtualized layer 1520 in a hosted system that virtualizes its hosts to perform both compute and network virtualization.

In this example, a datacenter 1550 includes two clusters 1555 and 1560, each cluster includes two host computers, and two VMs execute on each host computer. Moreover, the software switches (not shown) of the hosts are virtualized to implement two logical switches 1565 and 1570 that respectively connect five VMs of one tenant and three VMs of another tenant.

In some embodiments, the second set of controllers that manage the network virtualization also provide the AppliedTo firewall configuration and distribution. In other embodiments, a third set of controllers are used to provide the firewall configuration and distribution, while the first and second sets of controllers manage the computer and network virtualization. In still other embodiments, the same set of controllers manages the computer virtualization, the network virtualization and the firewall configuration/distribution.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 16:
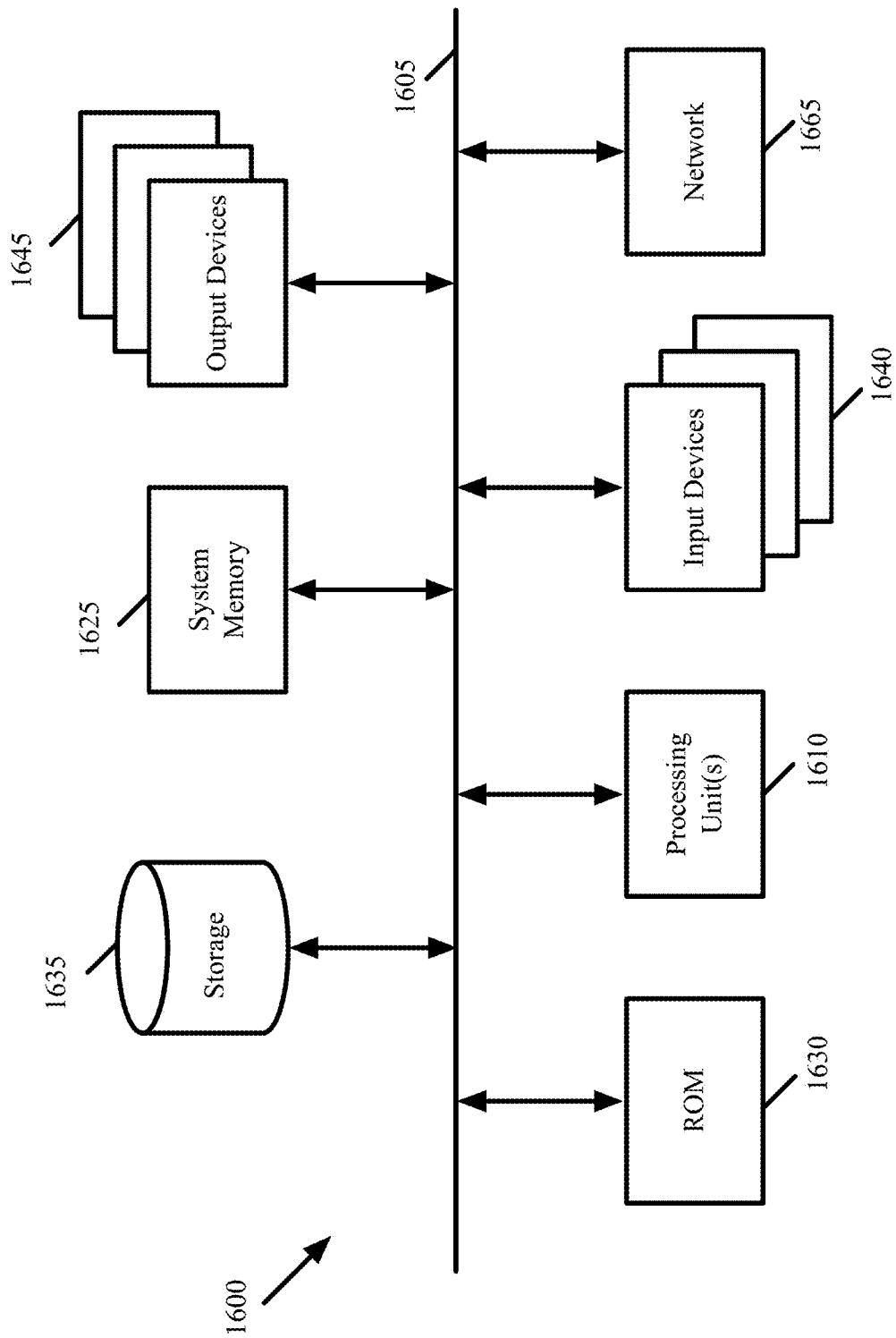
FIG. 16 illustrates an electronic device that can be used to implement some embodiments of the invention.

FIG. 16 conceptually illustrates an electronic system 1600 with which some embodiments of the invention are implemented. The electronic system 1600 can be used to execute any of the control, virtualization, or operating system applications described above. The electronic system 1600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1600 includes a bus 1605, processing unit(s) 1610, a system memory 1625, a read-only memory 1630, a permanent storage device 1635, input devices 1640, and output devices 1645.

The bus 1605 collectively represents all system, peripheral, and chipset buses that communicatively connect the numerous internal devices of the electronic system 1600. For instance, the bus 1605 communicatively connects the processing unit(s) 1610 with the read-only memory 1630, the system memory 1625, and the permanent storage device 1635.

From these various memory units, the processing unit(s) 1610 retrieve instructions to execute and data to process in order to execute the processes of the invention. The processing unit(s) may be a single processor or a multi-core processor in different embodiments.

The read-only-memory (ROM) 1630 stores static data and instructions that are needed by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive) as the permanent storage device 1635.

Other embodiments use a removable storage device (such as a floppy disk, flash drive, etc.) as the permanent storage device. Like the permanent storage device 1635, the system memory 1625 is a read-and-write memory device. However, unlike storage device 1635, the system memory is a volatile read-and-write memory, such a random access memory. The system memory stores some of the instructions and data that the processor needs at runtime. In some embodiments, the invention's processes are stored in the system memory 1625, the permanent storage device 1635, and/or the read-only memory 1630. From these various memory units, the processing unit(s) 1610 retrieve instructions to execute and data to process in order to execute the processes of some embodiments.

The bus 1605 also connects to the input and output devices 1640 and 1645. The input devices enable the user to communicate information and select commands to the electronic system. The input devices 1640 include alphanumeric keyboards and pointing devices (also called "cursor control devices"). The output devices 1645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 16, bus 1605 also couples electronic system 1600 to a network 1665 through a network adapter (not shown). In this manner, the computer can be a part of a network of computers (such as a local area network ("LAN"), a wide area network ("WAN"), or an Intranet, or a network of networks, such as the Internet. Any or all components of electronic system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, a number of the figures (including FIGS. 6-8 and 11-13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Also, several embodiments were described above in which the controller aggregates firewall rule sets for distribution into host-level or compute-cluster level data storages, before distributing the rules sets to different hosts or different sets of hosts in different clusters. Other embodiments, however, extract the rules differently. For instance, in some embodiments, the rule extractor initially groups the rule into different sets that are for different logical network constructs (e.g., logical switches, logical routers, logical networks, etc.). To distribute these rule sets, the controller (e.g., the rule extractor or rule distributor) then distributes the rules sets for the different logical network constructs to different hosts or compute clusters that implement the logical network constructs. In view of the foregoing, one of ordinary skill in the art would understand that the invention is not to be limited by the foregoing illustrative details, but rather is to be defined by the appended claims.

We claim:

1. A method of specifying firewall rules, the method comprising:
   specifying a plurality of high-level firewall rules that each includes a high-level construct tuple that identifies a set of high-level constructs in a network where the high-level firewall rule has to be enforced;
   translating each high-level firewall rule to a set of lower-level firewall rules, each lower-level firewall rule comprising a lower-level enforcement-node tuple that identifies a first set of lower-level enforcement nodes associated with the high-level construct of the high-level firewall rule; and
   distributing at least two different subsets of the lower-level firewall rules to at least two enforcement devices, each enforcement device comprising a second set of lower-level enforcement nodes for which the distributed subset of lower-level firewall rules are enforced according to a precedence hierarchy that defines a precedence order for the lower-level firewall rules.

2. The method of claim 1, wherein the distributing comprises using the values of the enforcement-node tuples to identify the two different subsets of the lower-level firewall rules to distribute to the two enforcement devices.

3. The method of claim 2, wherein the distributing further comprises storing the two identified subsets of the lower-level firewall rules in two different data storages before distributing the two different subsets to the two enforcement devices.

4. The method of claim 1, wherein each firewall rule further includes (i) a set of n-tuples for comparing with a set of attributes of a packet to determine whether a firewall rule is applicable to the packet, and (ii) an action identifier that specifies an action to perform on the packet when the firewall rule is applicable to the packet.

5. The method of claim 4, wherein at least one of the n-tuples is a wildcard value.

6. The method of claim 4, wherein each of the n-tuples includes a source identifier and a destination identifier.

7. The method of claim 1, wherein the two enforcement devices are two host devices on each of which one virtual machine executes.

8. The method of claim 1, wherein the two enforcement devices include (i) a virtualized device on which one virtual machine executes, and (ii) a non-virtualized device.

9. The method of claim 1 further comprising distributing, to at least a third enforcement device, at least one subset of the lower-level firewall rules that do not include any enforcement-node tuple.

10. The method of claim 9, wherein the third enforcement device is a third-party appliance.

11. The method of claim 1, wherein each lower-level firewall rule in each subset includes at least one enforcement-node tuple.

12. The method of claim 11 further comprising deriving a particular distributed firewall rule from a particular specified firewall rule, said deriving comprising deriving an enforcement-node identifier of the particular distributed firewall rule from an enforcement-node identifier of the particular specified firewall rule.

13. The method of claim 11 further comprising deriving a particular distributed firewall rule from a particular lower-level firewall rule, wherein an enforcement-node tuple of the particular distributed firewall rule is identical to an enforcement-node tuple of the particular lower-level firewall rule.

14. The method of claim 1, wherein at least one enforcement-node tuple specifically identifies an enforcement device.

15. The method of claim 1, wherein at least one enforcement-node tuple specifies at least one of a grouping of enforcement devices and a grouping of enforcement nodes.

16. A non-transitory machine readable medium storing a program for specifying a firewall rule, the program comprising sets of instructions for:
   receiving a set of tuples for a high-level firewall rule, the set of tuples for matching with a set of attributes of a packet;
   receiving a set of high-level construct identifiers that identify a set of a high-level constructs for enforcing the firewall rule in a network;
   translating each high-level firewall rule to a set of lower-level firewall rules, each lower-level firewall rule comprising a lower-level enforcement-node tuple that identifies a first set of lower-level enforcement nodes associated with the high-level construct of the high-level firewall rule;
   receiving an action to perform when a packet's set of attributes matches the set of tuples of the firewall rule;
   specifying the firewall rule based on the received set of tuples, the set of enforcement nodes and the received action; and
   distributing the specified firewall rule to a plurality of enforcement devices, each enforcement device comprising a second set of lower-level enforcement nodes for which the distributed subset of lower-level firewall rules are enforced according to a precedence hierarchy that defines a precedence order for the lower-level firewall rules.

17. A non-transitory machine readable medium storing a program for specifying firewall rules, the program comprising sets of instructions for:
   specifying a plurality of high-level firewall rules that each includes a high-level construct tuple that identifies a set of a high-level construct in a network where the high-level firewall rule has to be enforced;
   translating each high-level firewall rule to a set of lower-level firewall rules, each lower-level firewall rule comprising a lower-level enforcement-node tuple that identifies a first set of lower-level enforcement nodes associated with the high-level construct of the high-level firewall rule; and
   distributing at least two different subsets of the lower-level firewall rules to at least two enforcement devices, each enforcement device comprising a second set of lower-level enforcement nodes for which the distributed subset of lower-level firewall rules are enforced according to a precedence hierarchy that defines a precedence order for the lower-level firewall rules.

18. The non-transitory machine readable medium of claim 17,
   wherein the set of instructions for distributing comprises a set of instructions for using the values of the enforcement-node tuples to identify the two different subsets of the lower-level firewall rules to distribute to the two enforcement devices.

19. The non-transitory machine readable medium of claim 17,
   wherein each firewall rule further includes (i) a set of n-tuples for comparing with a set of attributes of a packet to determine whether a firewall rule is applicable to the packet, and (ii) an action identifier that specifies an action to perform on the packet when the firewall rule is applicable to the packet.

* * * * *